(12) United States Patent
Jowett et al.

(10) Patent No.: US 7,821,943 B2
(45) Date of Patent: *Oct. 26, 2010

(54) DATA TRANSMISSION

(75) Inventors: Frederick Haigh Jowett, London (GB); Peter George Fisher Russell, Basingstoke (GB)

(73) Assignee: weComm Limited, London (GB)

( * ) Notice: Subject to any disclaimer, the term of this patent is extended or adjusted under 35 U.S.C. 154(b) by 265 days.

This patent is subject to a terminal disclaimer.

(21) Appl. No.: 12/024,393

(22) Filed: Feb. 1, 2008

(65) Prior Publication Data

US 2008/0212471 A1 Sep. 4, 2008

(30) Foreign Application Priority Data

Feb. 1, 2007 (GB) ................................ 0701882.3

(51) Int. Cl.
*H04L 12/56* (2006.01)
(52) U.S. Cl. .................................... 370/235.1; 709/234
(58) Field of Classification Search ......... 370/230–235; 709/230–234
See application file for complete search history.

(56) References Cited

U.S. PATENT DOCUMENTS

| 6,643,496 | B1 * | 11/2003 | Shimoyama et al. | 455/69 |
| 7,054,774 | B2 * | 5/2006 | Batterberry et al. | 702/79 |
| 7,353,286 | B2 * | 4/2008 | Brown et al. | 709/235 |
| 7,436,772 | B2 * | 10/2008 | Padhye et al. | 370/235 |
| 2003/0198184 | A1 * | 10/2003 | Huang et al. | 370/231 |
| 2004/0240390 | A1 * | 12/2004 | Seckin | 370/252 |
| 2004/0267503 | A1 * | 12/2004 | Batterberry et al. | 702/188 |
| 2005/0021827 | A1 * | 1/2005 | Matsuura | 709/232 |
| 2005/0100100 | A1 * | 5/2005 | Unger | 375/240.27 |
| 2006/0031564 | A1 * | 2/2006 | Brassil et al. | 709/233 |

FOREIGN PATENT DOCUMENTS

| EP | 1233622 | 6/2004 |
| EP | 1643672 | 4/2006 |
| WO | WO2005/029237 | 3/2005 |

* cited by examiner

*Primary Examiner*—Ricky Ngo
*Assistant Examiner*—Ben H Liu
(74) *Attorney, Agent, or Firm*—Harness, Dickey & Pierce, P.L.C.

(57) ABSTRACT

Audio-visual data is provided to a network-connected terminal. First audio-visual data containing first information encoded at a first data rate and second audio-visual data containing first information encoded at a second data rate that is more than the first data rate are received. The first audio-visual data is provided to the network-connected terminal. A condition is identified to the effect that the amount of data being sent to the terminal is less than the available bandwidth. The difference between the data rates of the first and second audio-visual data is calculated, additional data packets are sent to the terminal to determine whether the available bandwidth is large enough to provide the first audio-visual data to the terminal; and if it is determined that the available bandwidth is large enough, provision of the first audio-visual data to the terminal is stopped and the second audio-visual data is provided instead.

28 Claims, 32 Drawing Sheets

DATA TRANSMISSION

TECHNICAL FIELD

The present invention relates to a method of providing data over a network.

BACKGROUND OF THE INVENTION

It is possible to wirelessly provide audio-visual data such as television channels, often via the Internet, to mobile devices such as mobile telephones. However, because available bandwidth frequently fluctuates it is generally necessary to send data representing a low quality of picture and sound in order to avoid high packet loss and a degraded user experience.

BRIEF SUMMARY OF THE INVENTION

According to an aspect of the present invention, there is provided a method of providing audio-visual data over a network, comprising the steps of receiving first audio-visual data containing first information encoded at a first data rate, and second audio-visual data containing first information encoded at a second data rate that is higher than the first data rate; providing the first audio-visual data to a network-connected terminal; identifying a condition to the effect that the amount of data being sent to the terminal is less than the available bandwidth; calculating the difference between the data rates of the first and second audio-visual data; sending additional data packets to the terminal to determine whether the available bandwidth is large enough to provide the first audio-visual data to the terminal; and if it is determined that the available bandwidth is large enough, stopping provision of the first audio-visual data to the terminal and providing the second audio-visual data to the terminal.

DESCRIPTION OF THE BEST MODE FOR CARRYING OUT THE INVENTION

FIG. 1

Figure 1:
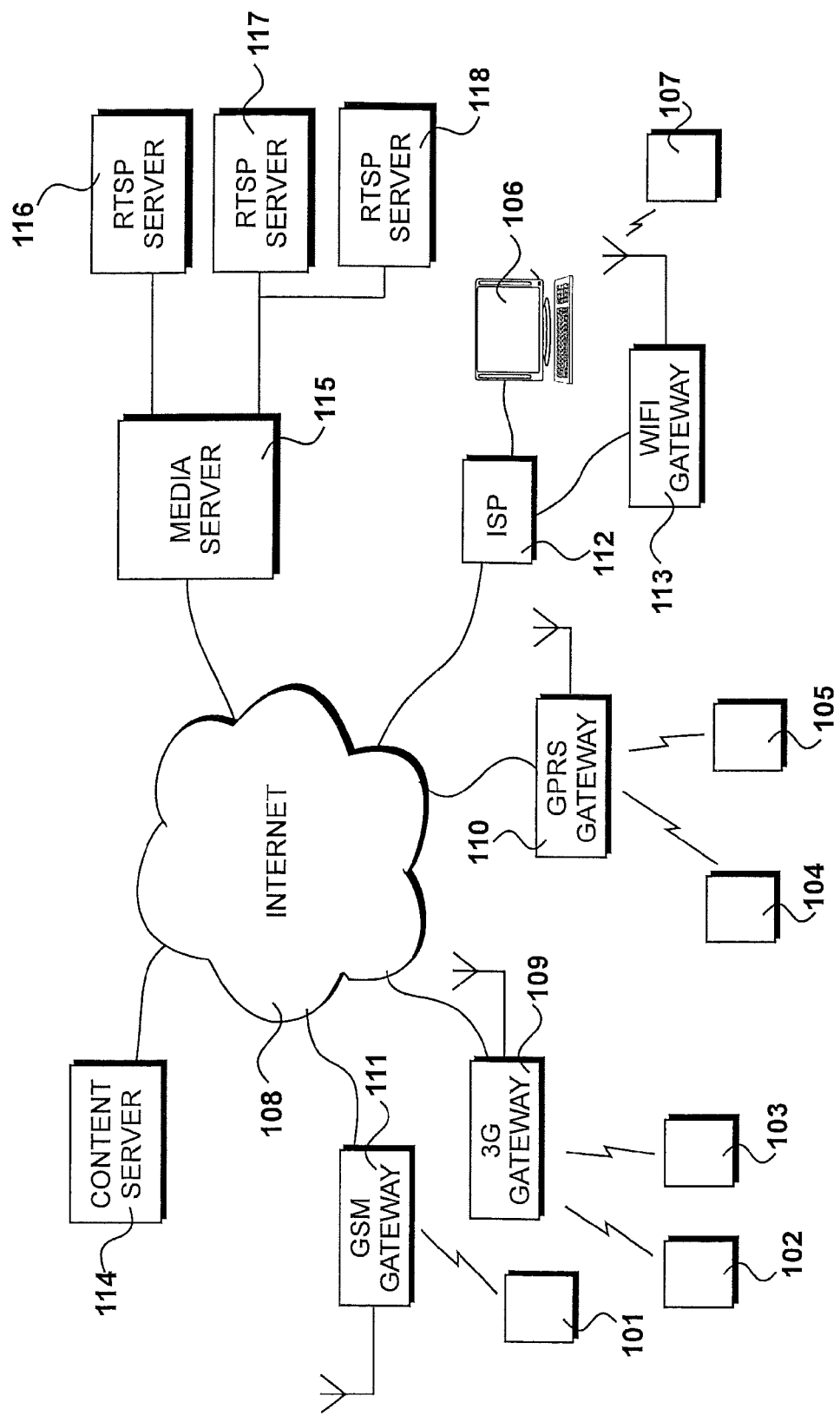
FIG. 1 illustrates a networked environment.

FIG. 1 illustrates a networked environment in which the invention may be used. Terminals 101, 102, 103, 104, 105, 106 and 107 receive data via the Internet 108. The terminals are typically mobile telephones or Personal Digital Assistants (PDAs) but could be any computing device capable of connecting to the Internet, including a home or office computer.

The data is provided over a variety of networks, including in this example radio networks such as mobile telephony networks or wireless networks. A Third Generation (3G) mobile telephony network, connected to the Internet 108, includes a gateway 109 which provides connectivity to a network of base stations. Mobile telephones 102 and 103 are each connected to one of these base stations. A General Packet Radio Service (GPRS) gateway 110 is connected to the Internet 108 and provides connection to a network of GPRS base stations. PDAs 104 and 105 are each connected to one of these stations. A GSM gateway 111 is connected to the Internet 108, providing connectivity for mobile telephone 101. Internet Service Provider (ISP) 112 is connected to the Internet 108 and provides internet access for PC 106 and a Wireless Network or Wireless Fidelity (WiFi) gateway 113. PDA 107 has a link to gateway 113. Thus there is a number of ways in which a terminal may link to the Internet 108 in order to receive data.

The data received by terminals 101 to 107 is provided by content server 114 and media server 115. Content server 114 provides many kinds of data required by users of terminals, for example news and sports, financial data, maps and telephone directories, television and cinema listings, and so on. Some of this data may be available to subscribers and some may be free. Users may make transactions with content server 114 such as purchasing stocks or placing bets, changing their subscription levels or personal details, and so on.

Media server 115 provides streamed audio-visual data such as television channels, media-on-demand or downloadable music videos. Streamed television channels are provided to media server 115 by Real Time Streaming Protocol (RTSP) servers 116, 117 and 118.

FIG. 2

Figure 2:
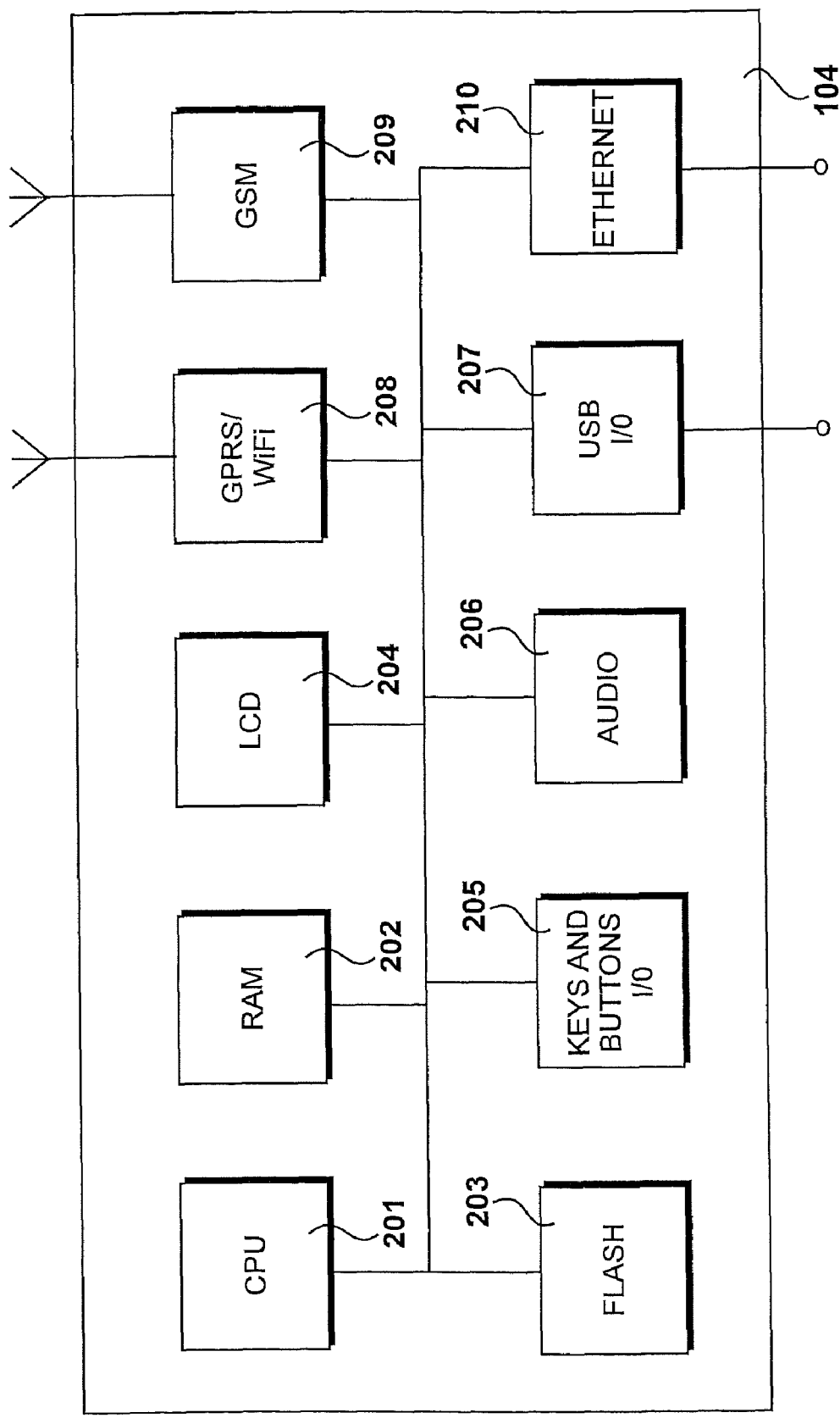
FIG. 2 shows a PDA shown in FIG. 1.

FIG. 2 details PDA 104. As described above, this is an example of a terminal that could be used in a system embodying the invention. It includes a CPU 201 with a clock speed of 400 megahertz (MHz) with memory 202 being provided by 64 megabytes (MB) of RAM. 256 MB of non-volatile FLASH memory 203 is provided for program and data storage. Liquid crystal display 204 is used to display information to the user. Input/output 205 processes the input of the keys and buttons 513 while audio input/output 206 provides a microphone and speaker interface for use with the telephone facility. Universal Serial Bus (USB) input/output 207 is used to connect PDA 511 to another computer, or to the Internet 110 via a wired connection. GPRS/WiFi connection 208 and GSM connection 209 enable PDA 511 to connect to wireless networks, while Ethernet card 210 enables PDA 511 to connect to a wired network, for example via a docking station on a computer.

FIG. 3

Figure 3:
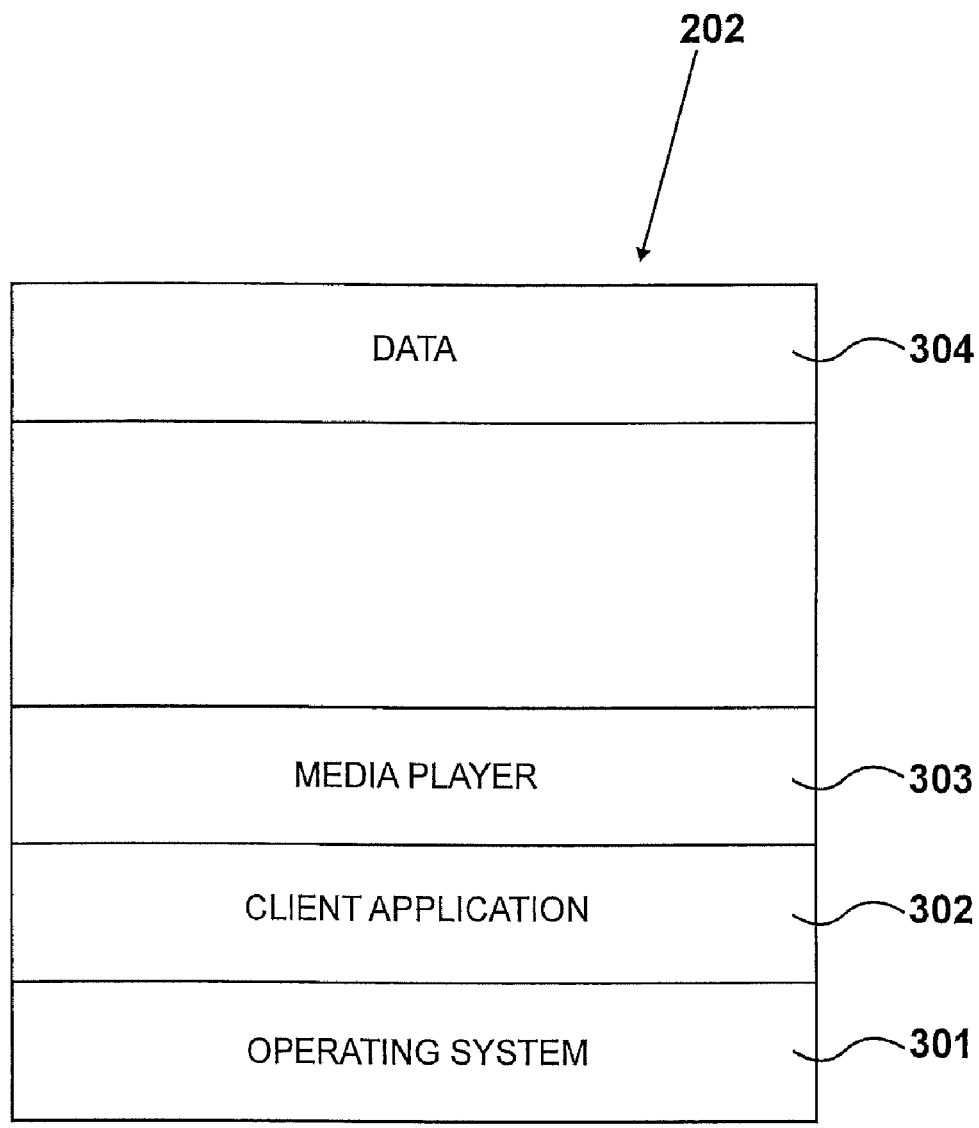
FIG. 3 shows illustrates the contents of the memory of the PDA shown in FIG. 2.

FIG. 3 illustrates the contents of memory 202 of PDA 104. An operating system 301 provides overall functionality for the device and content application 302 communicates with content server 114 to obtain and display data required by the user and to make transactions. Music player 303 is a plug-in that displays audio-visual data. This data may be stored on PDA 104 or provided by media server 115.

Memory 202 also contains data 303, which includes such data as undisplayed contents data or media data, packets to be sent or that have not been acknowledged, and data required by operating system 301 and content application 302.

FIG. 4

Media player 303 is a "black box" plug-in with a simple API. It will generally only play data that is sent using the Real Time Protocol (RTP), although it may also comprehend a proprietary protocol, and will accept a very limited number of commands. A media player application on, for example, a desktop computer would be much more sophisticated but since the invention described herein is designed to function on any kind of terminal it must interact with media players having the least amount of functionality, such as that described herein.

Audio-visual data is typically sent from an RTSP (Real Time Streaming Protocol) server to an RTSP client over UDP/IP using a communications link that is negotiated using RTSP over a TCP/IP link. It comprises data packets, sent in two RTP streams, one for video data and one for audio data, and two RTCP (Real Time Control Protocol) streams which contain control packets. A media player is generally configured to act as an RTSP client.

Figure 4:
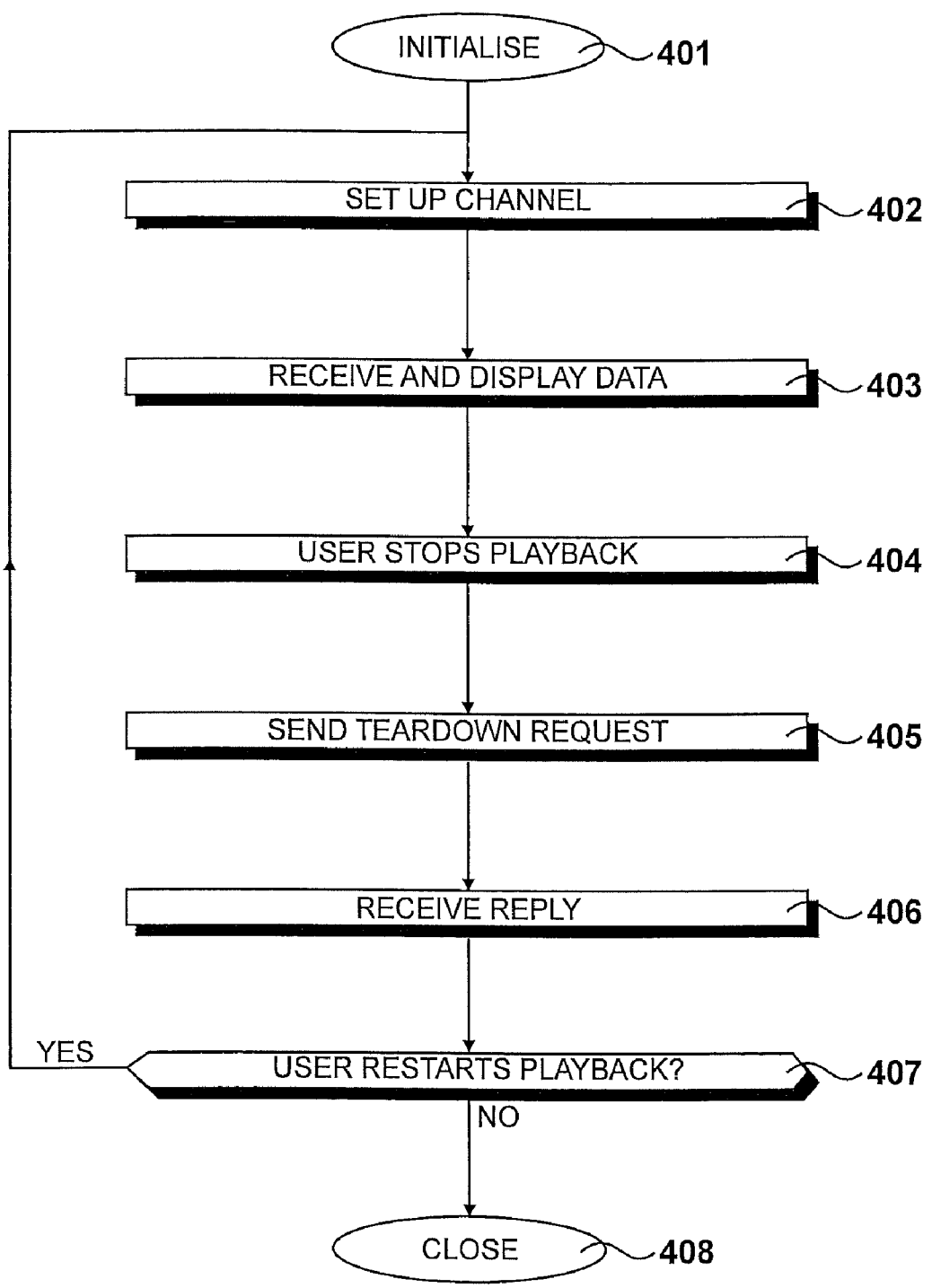
FIG. 4 shows steps carried out by a media player on the PDA shown in FIG. 2.

Steps performed by media player 303 are described in FIG. 4. At step 401 the player is initialized by operating system 301 or content application 302. At step 402 a communications link is set up. This may be to data stored locally on flash memory 203, as is likely if the player has been initialized by operating system 301, or to a remote location as is the case if it has been initialized by content applications 302. For the purposes of this description, the communications link is with media server 115 via Internet 108.

At step 403 audio-visual data is received over the communications link and displayed on LCD 204. Additionally, report packets are generated and sent over the communications link. These report packets confirm that the link is open and also contain information such as the number of lost packets.

At step 404 a STOP request is received, usually as a result of the user stopping playback on the device, and thus at step 405 a TEARDOWN request is sent over the communications link. This closes the communications link and at step 406 a reply is received confirming this. At step 407 a question is asked as to whether the user restarts playback and if this question is answered in the affirmative control is returned to step 402 and a new communications link is opened. If it is answered in the negative then the plug-in is terminated at step 408.

FIG. 5

Figure 5:
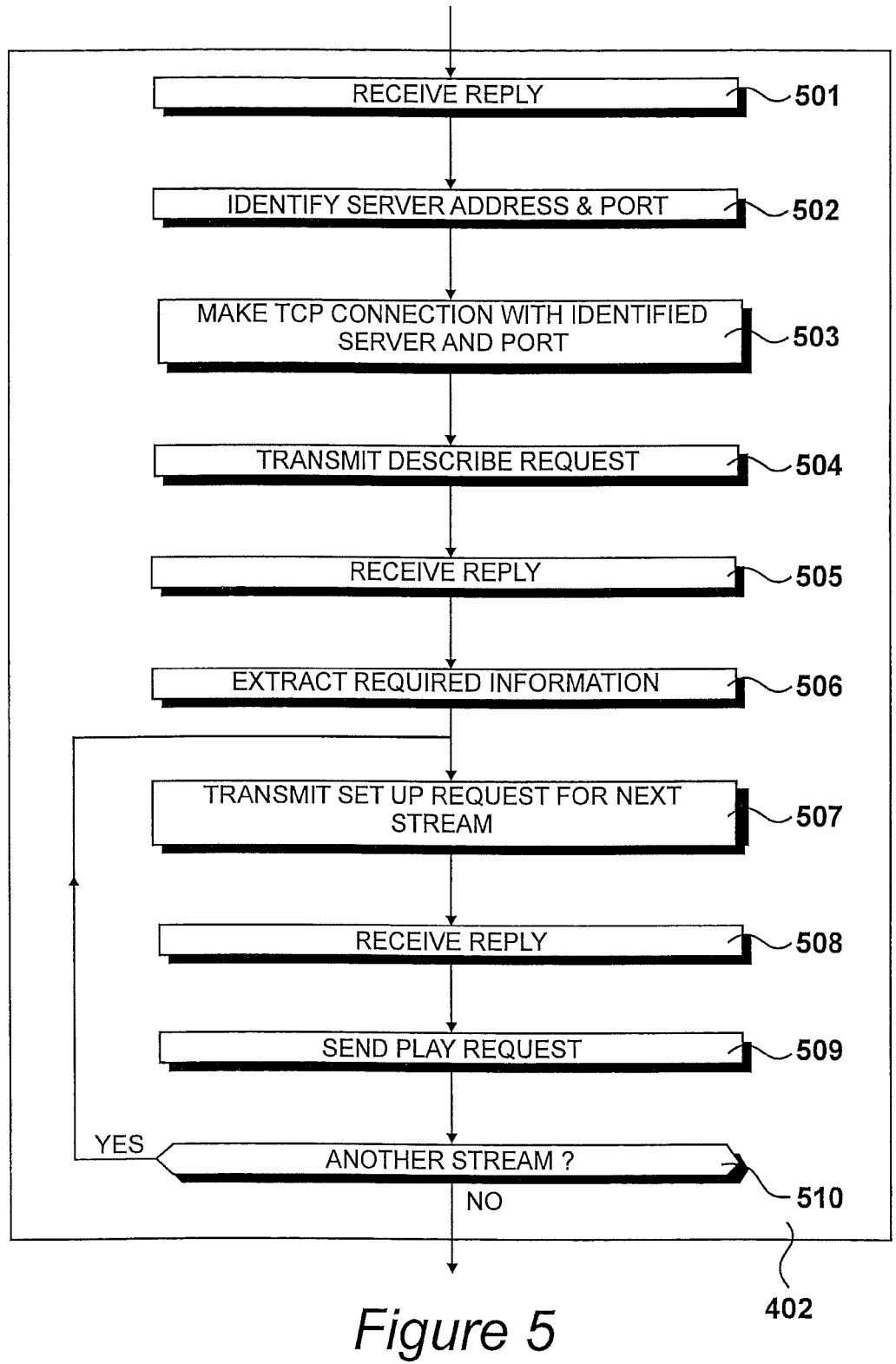
FIG. 5 details steps carried out in FIG. 4 to negotiate a communications link.

FIG. 5 details step 402 at which a communications link is defined by a series of Real Time Streaming Protocol (RTSP) messages sent over TCP. At step 501 a universal resource locator (URL) is received. This URL must start with "rtsp://" and be followed by an address of a server, a port number, and an identification of what is to be played, such as a file name. The URL is usually passed to the player in the form of a text string. At step 502 the player identifies the server address and port from the URL and at step 503 it makes a TCP connection with the identified port on the identified server. Once this TCP connection is made a DESCRIBE request is transmitted over it. This requests the server to describe the data that is going to be sent and thus at step 505 a reply is received and the required information is extracted at step 506.

The information received includes an indication as to how many streams there are within the data. If the data is audio only then the indication will be that there is one stream, while for audio-visual data it will be two. Currently there is no other type of data that can be streamed but provision is made within the protocol for as many streams as are necessary. Thus at step 507 a SETUP request is transmitted for the first identified stream. This request includes the number of the port on the device to which the stream of data packets is to be delivered, and also the port to which the stream of control packets associated with the stream of data packets is to be delivered. Typically, these port numbers will be consecutive. At step 508 a reply is received from the server indicating the ports that it is using and at step 509 a PLAY request is sent to start the sending of packets.

At step 510 the question is asked as to whether there is another stream to be set up. If this question is answered in the affirmative then control is returned to step 507 and a SETUP request is transmitted again. However, if all streams have been set up then the question is answered in the negative and step 402 is completed.

Once this communications link is established then data is sent using RTP, typically over UDP since acknowledgements are not generally required but over TCP if UDP is not possible, to the two identified ports. Additionally, control packets are sent using the Real Time Control Protocol (RTCP) to the two additional ports. The original TCP connection may then be broken.

Thus it can be seen that for a typical communications link along which a stream of audio data and a stream of video data are to be sent, a total of six TCP requests must be made before data can be transmitted, and any number of these requests may need to be retransmitted if packets are lost. This can take a long time, particularly on a wireless link, and thus it may take between ten and twenty seconds to set up a communications link before data can be streamed to a terminal. This may be acceptable when the user wishes to view a single item, such as in a video conferencing environment. However, in the environment shown in FIG. 1 the user of a terminal may be watching television channels on the terminal. Such a user typically wishes to change channel fairly frequently, for example when "channel surfing" to find a suitable programme to watch, when flicking between channels to check whether a programme has begun, when changing to another channel during a commercial break, and so on. Using the current system, every time the user wished to change channel a new communications link would have to be negotiated. Clearly, a user will not tolerate a twenty-second delay every time he wishes to change channel.

FIG. 6

Once the communications link is set up, data packets are streamed to PDA 104 using RTP. For each RTP stream, there is an RTCP stream of control packets. Thus the data comprises two sets of streams, each set comprising a stream of data packets and a stream of control packets.

The control packets contain information necessary to allow media player 303 to display the audio-visual data correctly. In particular, they relate a display time to an server time. Each stream of RTP packets is considered to have a display time as exemplified in the graph shown in FIG. 6. This display time is linearly related to the server time and can be described using a gradient and an offset. The RTSP server that generates the RTP data packets also generates a random gradient and offset for each stream, (a preset gradient and random offset may be used instead). These are used to generate a display time for each RTP packet in that stream. The player receiving that packet must convert the display time into an server time in order to decide when the data included in that packet should be displayed.

Figure 6:
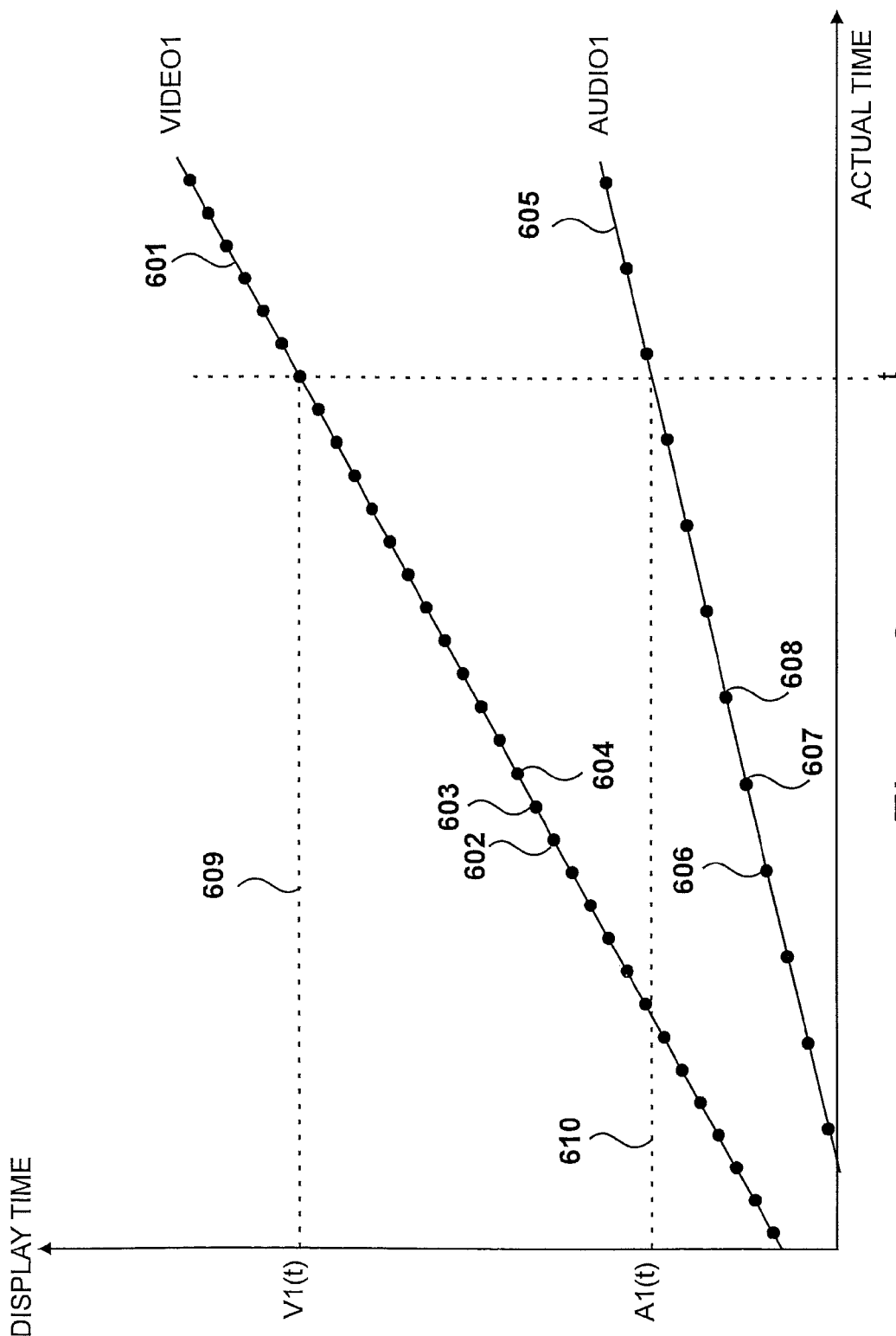
FIG. 6 illustrates the relationship between display time and server time in data sent over the communications link negotiated in FIG. 5.

As shown in FIG. 6, a video stream 601 includes a plurality of video data packets such as packets 602, 603, and 604. An audio stream 605 includes a plurality of audio data packets such as packets 606, 607 and 608. These are more infrequent than the video data packets because audio data is typically smaller. Streams 601 and 605 have different gradients and different offsets. Thus at time t, the display time for video stream 601 is shown by line 609 while the display time for audio stream 605 is shown by line 610. Thus two data packets that should be displayed at similar times may have very different display times.

Since the audio stream and video stream have different display times, additional information is required to display the audio and video data synchronously. Each control packet for each stream contains the server time at which the control packet was generated and the corresponding display time. Different players use this information in different ways, but typically the gradient is defined during setup, and an extrapolation is made from the last few received control packets to define an adder which when combined with the defined gradient gives a time definition. This is used to determine what the server time is of a received RTP packet. Alternatively, a client may also be able to determine the gradient using extrapolation.

FIG. 7

Figure 7:
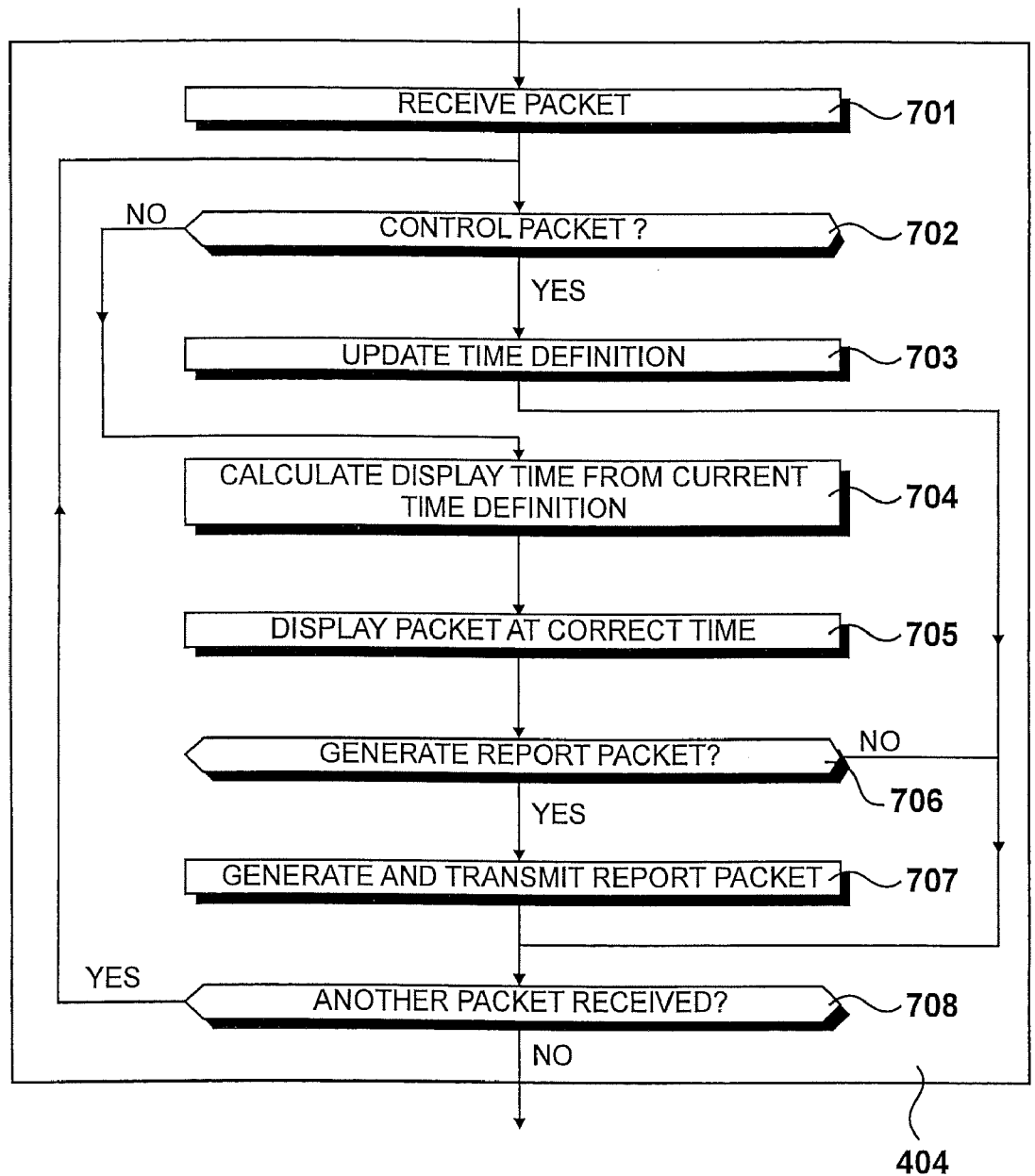
FIG. 7 details steps carried out in FIG. 4 to receive and display data.

FIG. 7 details step 404 at which data is received and displayed by media player 303. At step 701 a packet is received and at step 702 a question is asked as to whether it is a control packet, which can be determined by which port a packet arrives on. If this question is answered in the affirmative then at step 703 the time definition for the relevant stream is updated. If the question is answered in the negative then the packet is a data packet and at step 704 the display time for the data packet is calculated from the current time definition. At step 705 the packet is displayed at the correct time. It may be that data packets received later than the current data packet should be displayed earlier, or vice versa. This is because packets may be routed differently and take a shorter or longer time to arrive. Also, packets may be lost and thus there may be times at which no data is displayed at all. However, this is not likely to be very noticeable to the user as long as the packet loss is not too high.

At step 706 a question is asked as to whether a report packet should be generated. These are sent every few seconds, and thus if the question is answered in the affirmative then a report packet is generated and transmitted at step 707. Amongst other information, this report packet contains a loss fraction. Because all data packets are numbered sequentially it is possible for the player to know how many packets have not been received and this information is included in the report packet.

At this stage, and following step 703, a question is asked as to whether another packet has been received. If this question is answered in the affirmative then control is returned to step 702 and the packet is processed. If it is answered in the negative then step 404 is completed.

FIG. 8

Figure 8:
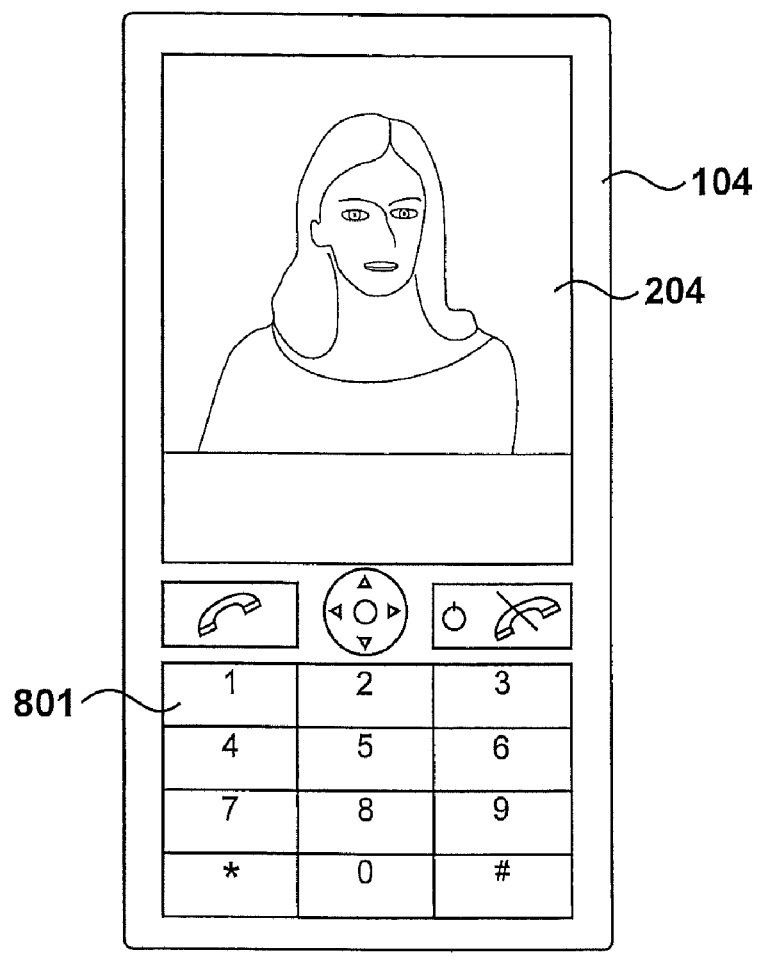
FIG. 8 illustrates the PDA shown in FIG. 2 displaying data.

An illustration of PDA 104 is shown in FIG. 8. Audio-visual data is displayed on LCD 204 and the user can control the device using buttons 801. In the illustration, the user is viewing a news channel.

According to prior art systems, if the user wished to change channel the player 303 would terminate the communications link and negotiate a new one as described with respect to FIG. 5, which could take as long as twenty seconds. However, according to the invention described herein, the user may change channel much more quickly.

FIG. 9

Figure 9:
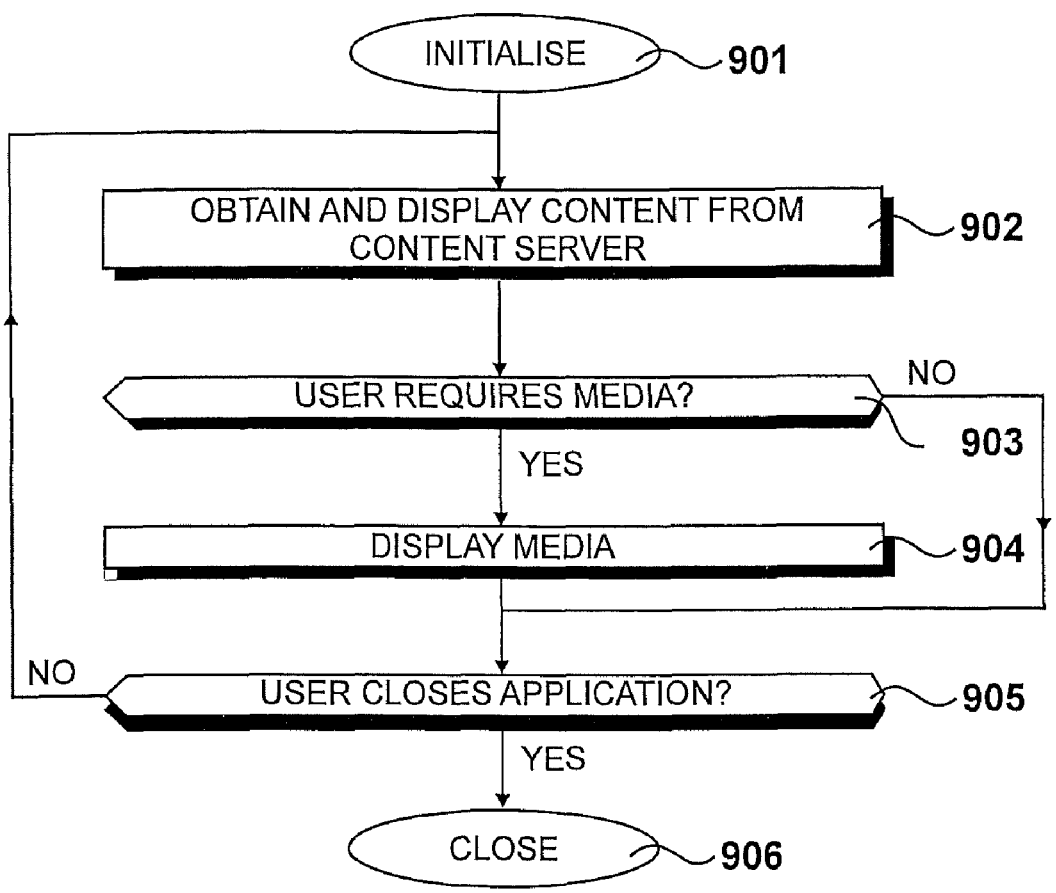
FIG. 9 shows steps carried out by a content application on the PDA shown in FIG. 2.

FIG. 9 details content application 302. This is an application loaded on PDA 104 that communicates with content server 114 via internet 108 in order to supply content to the user as required and also to facilitate transactions made by the user. Content application 302 communicates with media player 303 using the limited range of commands that the player will accept, typically only PLAY, STOP or PAUSE. It will also accept a text string containing a URL as described with reference to FIG. 5. At step 901 the content application 302 initializes when the PDA 104 is switched on. At step 902 the application obtains and displays content as required by the user. At step 903 a question is asked as to whether the user wishes to view media, indicated by the user making certain keypresses using keys 801 based on options displayed on LCD 204, and if this question is answered in the affirmative then at step 904 audio-visual data is obtained and displayed. At step 905 a question is asked as to whether the user is closing the application. This usually occurs when the device is switched off, but the application can be closed at any time. If this question is answered in the negative then control is returned to step 902 and if it is answered in the negative then the application closes at step 906.

FIG. 10

Figure 10:
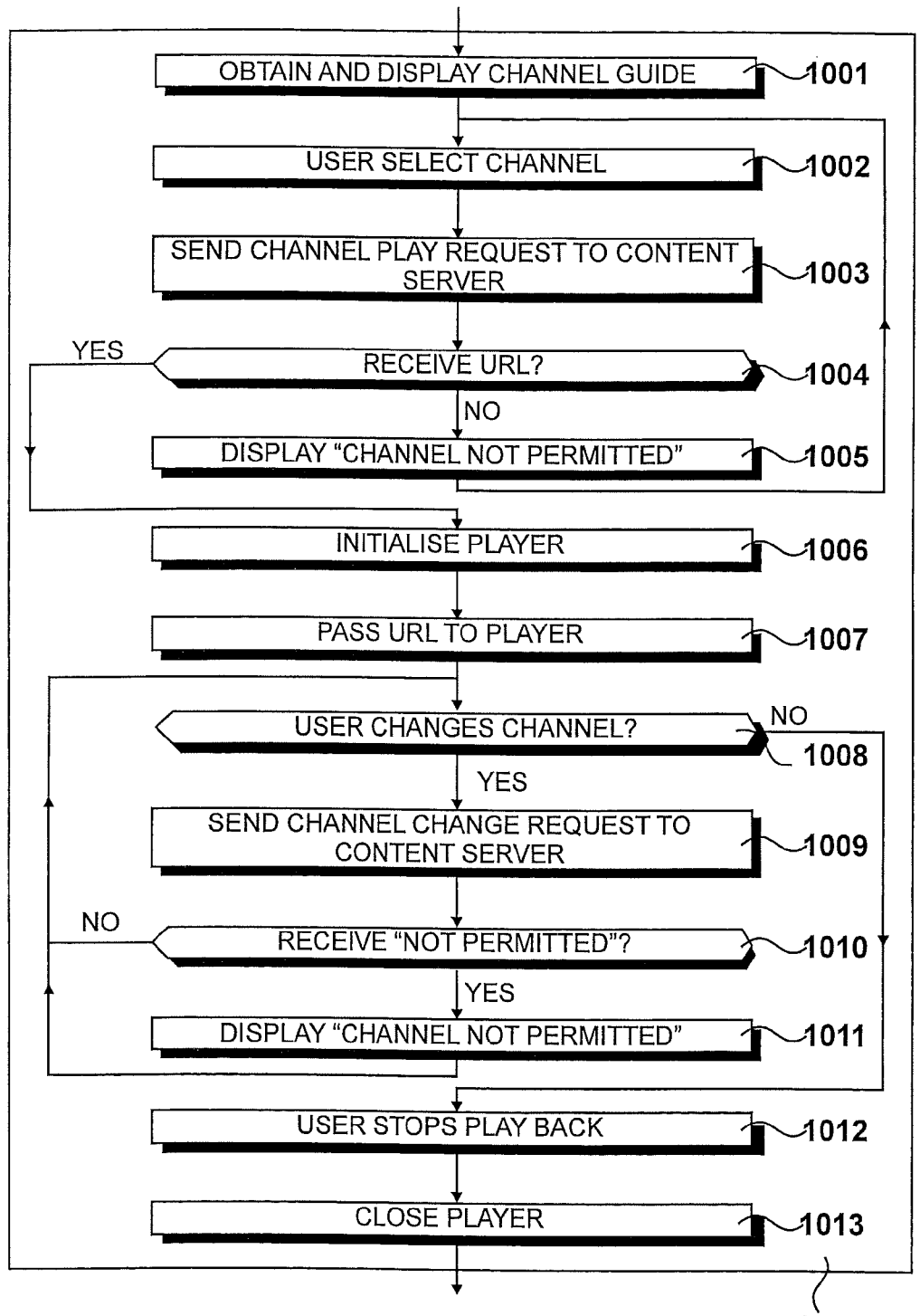
FIG. 10 details steps carried out in FIG. 9 to obtain and display data.

FIG. 10 details step 904 during which audio-visual data is obtained and displayed. At step 1001 a channel guide is obtained and displayed on LCD 204. This guide indicates to the user which programs are being shown on available channels and at what time. Channels that are not available to the user may also be shown, for example to encourage the user to increase his subscription level. At step 1092 the user selects a channel to view and at step 1003 a CHANNEL PLAY request is sent to content server 114. The content server generates a URL and returns it to the device over internet 108 and thus at step 1004 a question is asked as to whether a URL has been received. If this question is answered in the negative then either no message or an error message has been received from content server 114, and so the message "CHANNEL NOT PERMITTED" is displayed at step 1005 before control is returned to step 1002 for a new channel selection. However, if it is answered in the affirmative then at step 1006 media player 1003 is initialized and at step 1007 the received URL is passed to the player in the form of a string of text. The URL points the player to media server 115, and upon receipt the player carries out the steps shown in FIG. 5 to set up a communications link to start streaming and displaying audio-visual data.

At step 1008 a question is asked as to whether the user wishes to change the channel, indicated by the user making certain keypresses using keys 801 based on options displayed on LCD 204. If this question is answered in the affirmative then at step 1009 a CHANNEL CHANGE request is sent to content server 114. As will be described further with respect to FIG. 14, upon receipt of this request content server 114 requests media server 115 to change the data sent via the established communications link. Thus the player receives different data, ie a new channel, without having to terminate and renegotiate the communications link. The channel change thus appears virtually seamless to the user.

Thus at step 1010 a question is asked as to whether the message "NOT PERMITTED" has been received, and if this question is answered in the affirmative then the message "CHANNEL NOT PERMITTED" is displayed to the user. Otherwise, the channel change has been carried out and in both cases then control is returned to step 1008. Eventually the question asked at step 1008 is answered in the negative and at step 1012 the user stops play in the media player. The player is closed at step 1013 and step 904 is complete.

FIG. 11

Figure 11:
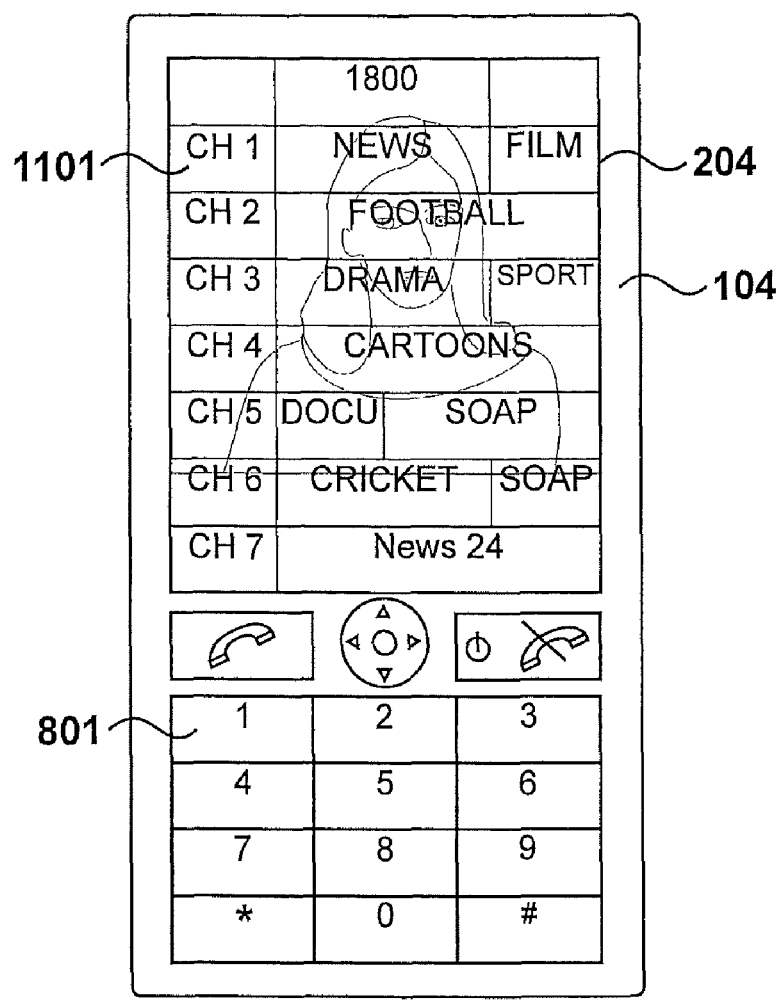
FIG. 11 illustrates the PDA shown in FIG. 2 displaying a channel guide.

PDA 104 is again illustrated in FIG. 11. The user has indicated that he wishes to change channel and so content application 302 overlays a channel guide 1101 on the display 204. The user may select a channel to watch using buttons 801, following which the content application 302 contacts the media server 114 to change channel. Media server 115 sends the packets of a different channel down the existing communications link and thus the channel change is transparent to the media player 303. However, because each data stream of the new channel will have a different display time from the current streams, they cannot be simply switched over. The player will continue to apply its existing time definitions to the new packets, thus leading to a calculation of server time that could be wrong by seconds, minutes, days or even years. Further, the new channel's data streams will have different packet sequence numbers from the original streams.

FIG. 12

Figure 12:
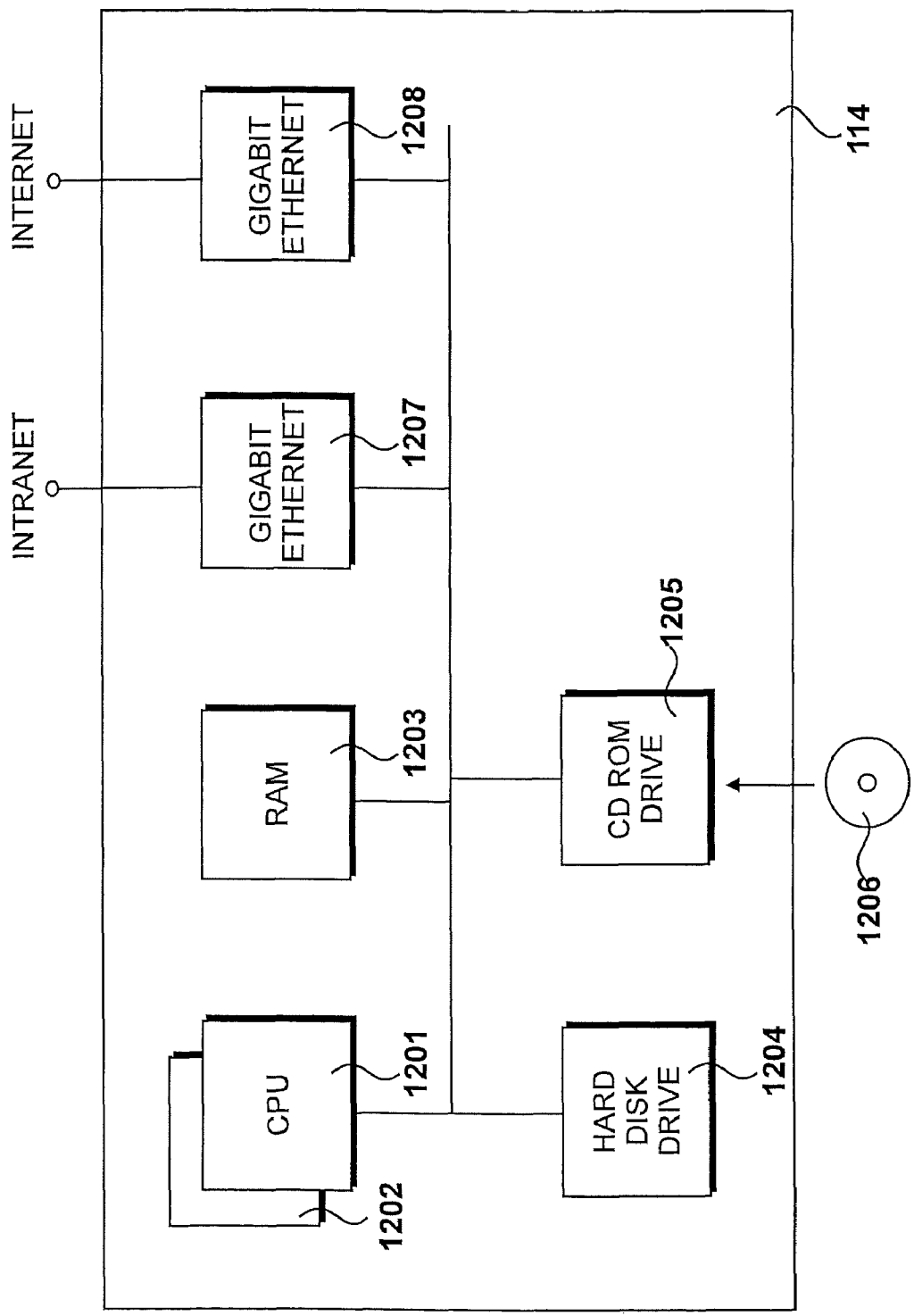
FIG. 12 shows a content server shown in FIG. 1.
Figure 13:
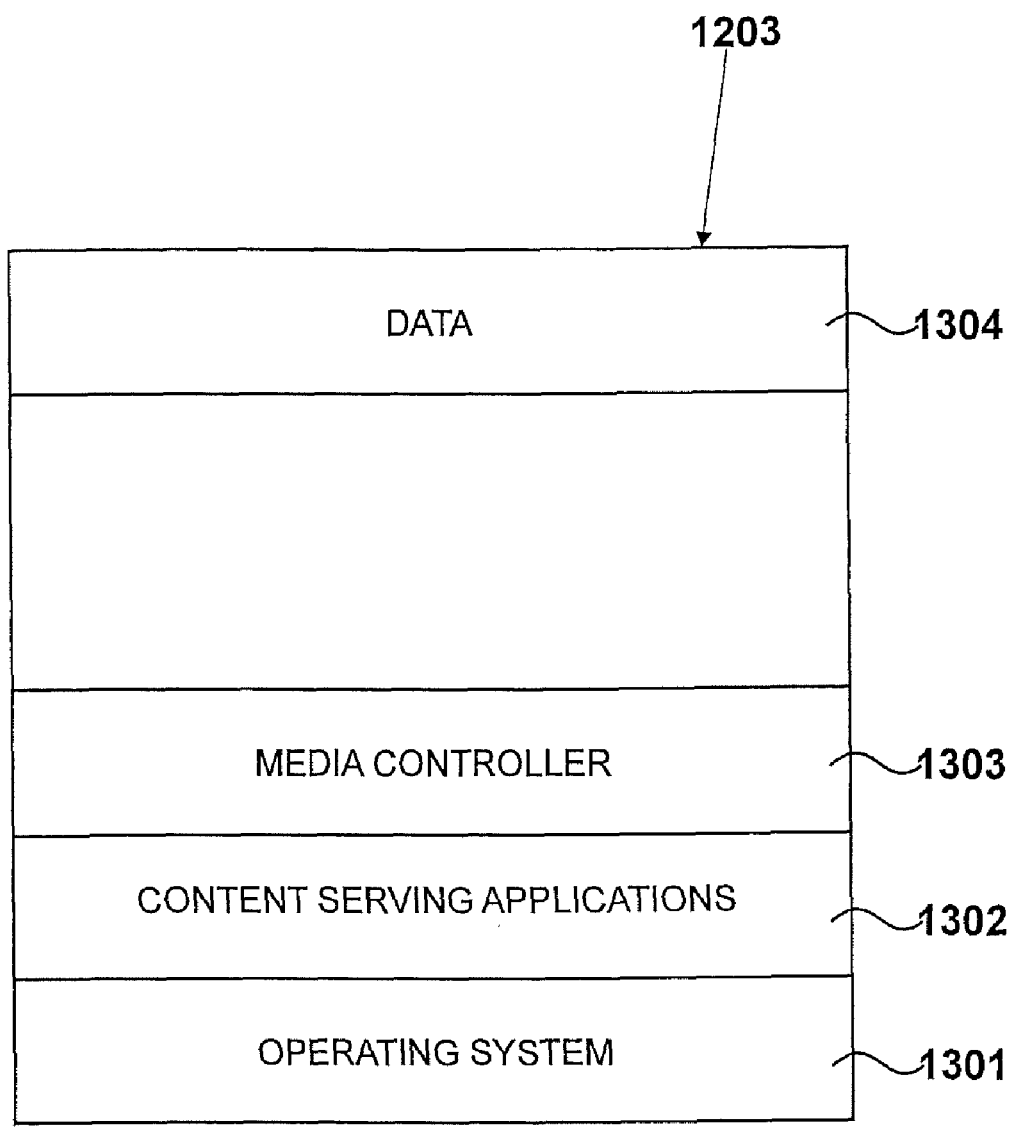
FIG. 13 shows the contents of the memory of the content server shown in FIG. 12.

FIG. 12 shows content server 114. It comprises two parallel central processing units (CPUs) 1201 and 1202 having a clock frequency of 3 GHz, a main memory 1203 comprising 4 GB of dynamic RAM and local storage 1204 provided by a 20 Gb-disk array. A CD-ROM disk drive 1205 allows instructions to be loaded onto local storage 1204 from a CD-ROM 1206. A first Gigabit Ethernet card 1207 facilitates intranet connection, and can also be used for installation of instructions. A second Gigabit Ethernet card 1208 provides a connection to Internet 108.

FIG. 13

The contents of main memory 1203 are illustrated in FIG. 12. Operating system 1301 provides operating system instructions for common system tasks and device abstraction. In this example a Windows® Server operating system is used, but another system providing similar functionality could be used. Content serving applications 1302 include instructions for delivering content to terminals, updating personal details, making transactions, and so on. Media controller 1303 receives requests from terminals for the playing of audio-visual data, including channel change requests, and communicates with media server 115. Data 1304 includes session data for each user, buffered messages, and other data used by operating system 1301, content serving application 1302 and media controller 1303.

FIG. 14

Figure 14:
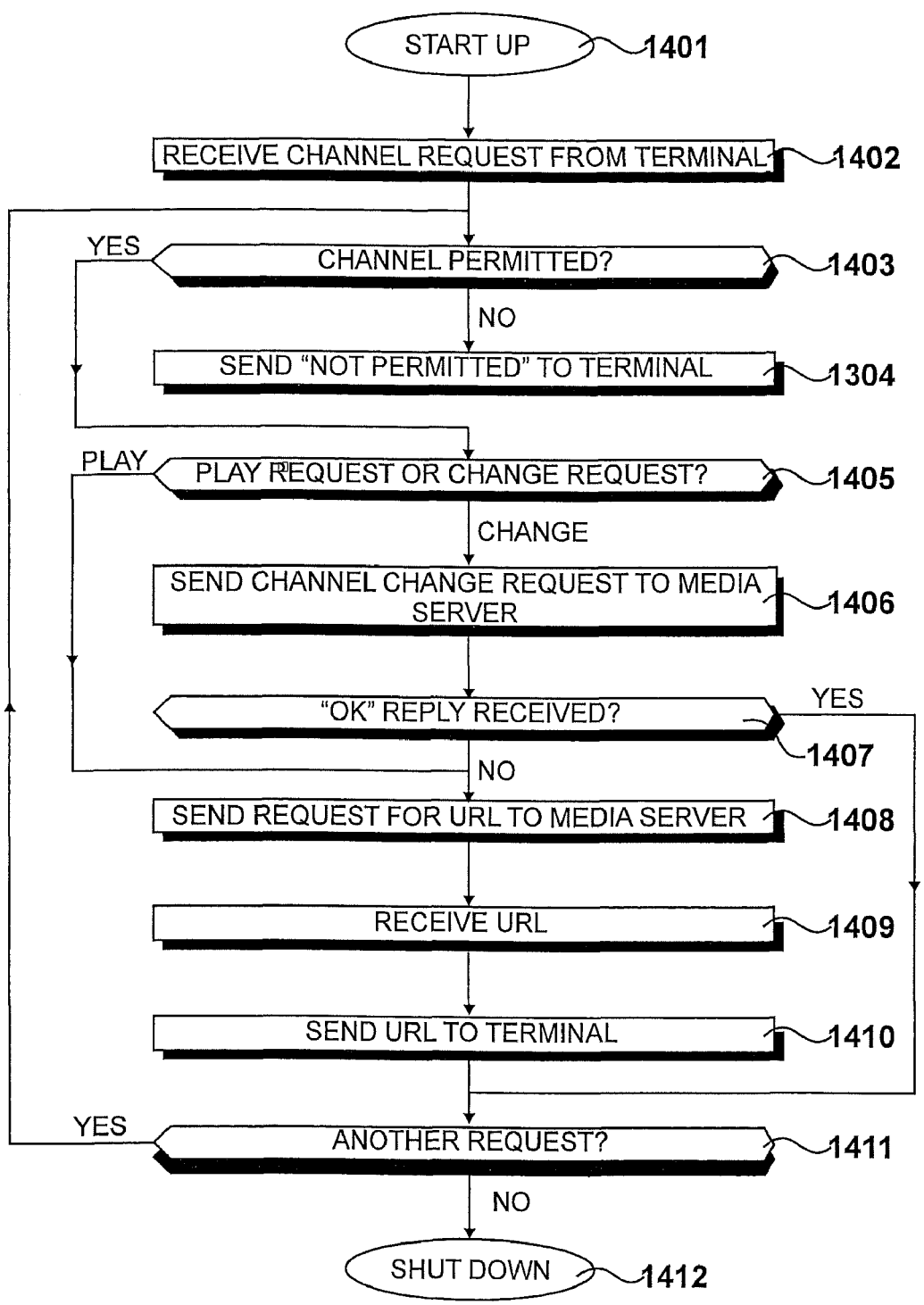
FIG. 14 details steps carried out by a media controller on the content server shown in FIG. 12.

FIG. 14 details steps carried out by media controller 303 to serve requests from terminals such as PDA 104. At step 1401 it starts, typically during the starting of content server 114, and at step 1402 a request to view a channel is received from a content application on a terminal, such as that sent by content application 302 at step 1003. At step 1403 a question is asked as to whether the user is permitted to view the requested channel. This is done by loading user data from hard drive 1204 into main memory 1203 and checking the user permissions. If the question is answered in the negative then at step 1404 the message "NOT PERMITTED" is sent back to the requesting terminal at step 1404. However, if it is answered in the affirmative then at step 1405 a question is asked as to whether the request is a CHANNEL PLAY request, indicating that a new communications link needs to be opened, or a CHANNEL CHANGE request, indicating that the link is open but that a new channel is required.

If the answer is CHANGE then at step 1406 a CHANNEL CHANGE request is sent in turn to media server 115. This request identifies the requesting device and the requested channel. At step 1407 a further question is asked as to whether a reply of "OK" is received. If this question is answered in the negative then for some reason the media server cannot change channel, probably because the communications link has been broken. Thus at this stage, or if the received request is a CHANNEL PLAY request, a request for a new URL is sent to media server 115. At step 1409 the URL is received and at step 1410 it is sent to the requesting terminal in order that the terminal can open a TCP connection using the URL. The media controller takes no further part in the set-up of the communications link.

At this stage, or following an "OK" reply at step 1407, a question is asked at step 1411 as to whether another request has been received. If this question is answered in the affirmative then control is returned to step 1403 and the process is repeated. Eventually the question is answered in the negative and the process is shut down at step 1412, usually with the switching off for some reason of content server 114.

Thus media controller acts as an intermediary between a terminal such as PDA 104 and media server 115, checking that a user is permitted to view channels before requesting media server 115 to fulfill the request.

FIG. 15

Figure 15:
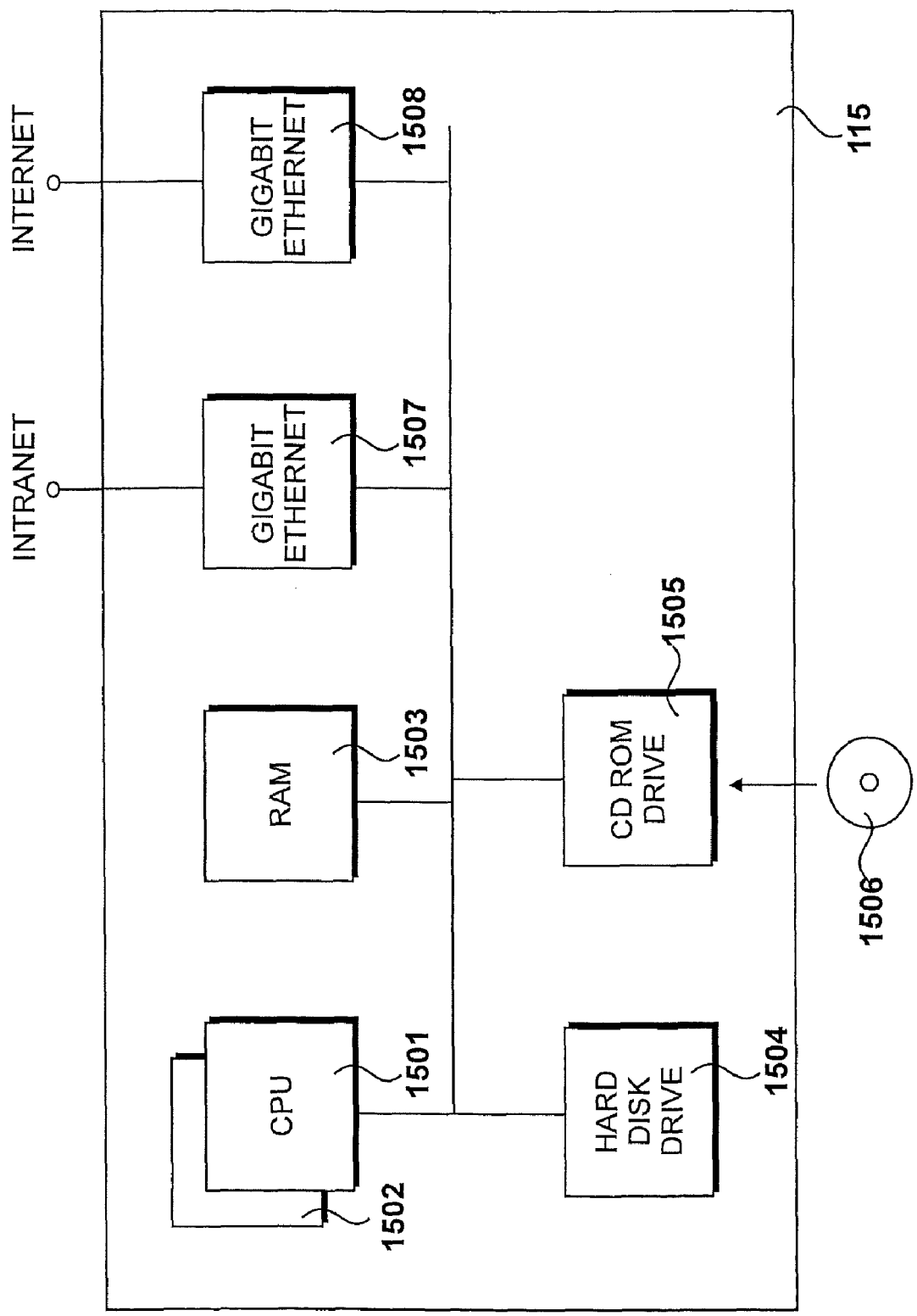
FIG. 15 shows a media server shown in FIG. 1.

FIG. 15 shows media server 115, which is substantially similar to content server 114. It comprises two parallel central processing units (CPUs) 1501 and 1502 having a clock frequency of 3 GHz, a main memory 1503 comprising 4 GB of dynamic RAM and local storage 1504 provided by a 20 Gb-disk array. A CD-ROM disk drive 1505 allows instructions to be loaded onto local storage 1504 from a CD-ROM 1506. A first Gigabit Ethernet card 1507 facilitates intranet connection to RTSP servers 116, 117 and 118. A second Gigabit Ethernet card 1508 provides a connection to Internet 108.

FIG. 16

Media server 115 receives data streams from RTSP servers 116 to 118 that are forwarded to the terminals on request. Media server 115 sets up a plurality of server channels 1601, 1602, 1603, 1604, 1605, 1606, 1607, 1608 and 1609, each of which emulates an RTSP client and negotiates a communications link in the usual way in order to receive audio-visual data from the RTSP servers. Thus, for example, server channel 1601 negotiates communications link 1610 with RTSP server 116 in order to receive the two RTP streams and two RTCP streams that define a first television channel. This audio-visual data contains the same programmes that are sent over the usual television and satellite networks, but it is encoded suitably for display on terminals, typically reducing the amount of data considerably. In this embodiment all the data is encoded using the same encoder to allow easier switching of channels, but in other embodiments transcoding of the outgoing data could be used at the server, thus allowing different encodings of the different incoming channels.

For each terminal that has requested audio-visual data a user channel is defined, such as user channel 1611 that communicates with PDA 104, user channel 1612 that communicates with PC 106, user channel 1613 that communicates with mobile telephone 103, and user channel 1614 that communicates with mobile telephone 102. Each user channel emulates an RTSP server in order to communicate with the media player on its respective terminal.

Each user channel receives input from one server channel. Thus, for example, user channel 1611 receives input from server channel 1601, user channels 1612 and 1613 both receive input from server channel 1604, and user channel 1614 receives input from server channel 1608. These inputs are the data received from the RTSP servers by the respective server channel. On first set-up of a user channel the input data is passed by the user channel to the terminal without alteration. However, upon fulfillment of a channel change request the input is changed. Thus, when PDA 104 requests a change of channel to the channel provided by server channel 1603 the media server 115 changes the input to user channel 1611. The input represented by line 1615 is stopped and instead the data from server channel 1603 is input, as represented by line 1616.

However, once the channel has been changed the data can no longer be sent unaltered to PDA 104. The display time within each RTP and RTCP packet must be altered before being sent. Further, since the media player is expecting packet numbers to continue in sequence, the sequence numbers of the packets must also be altered.

FIG. 17

Figure 17:
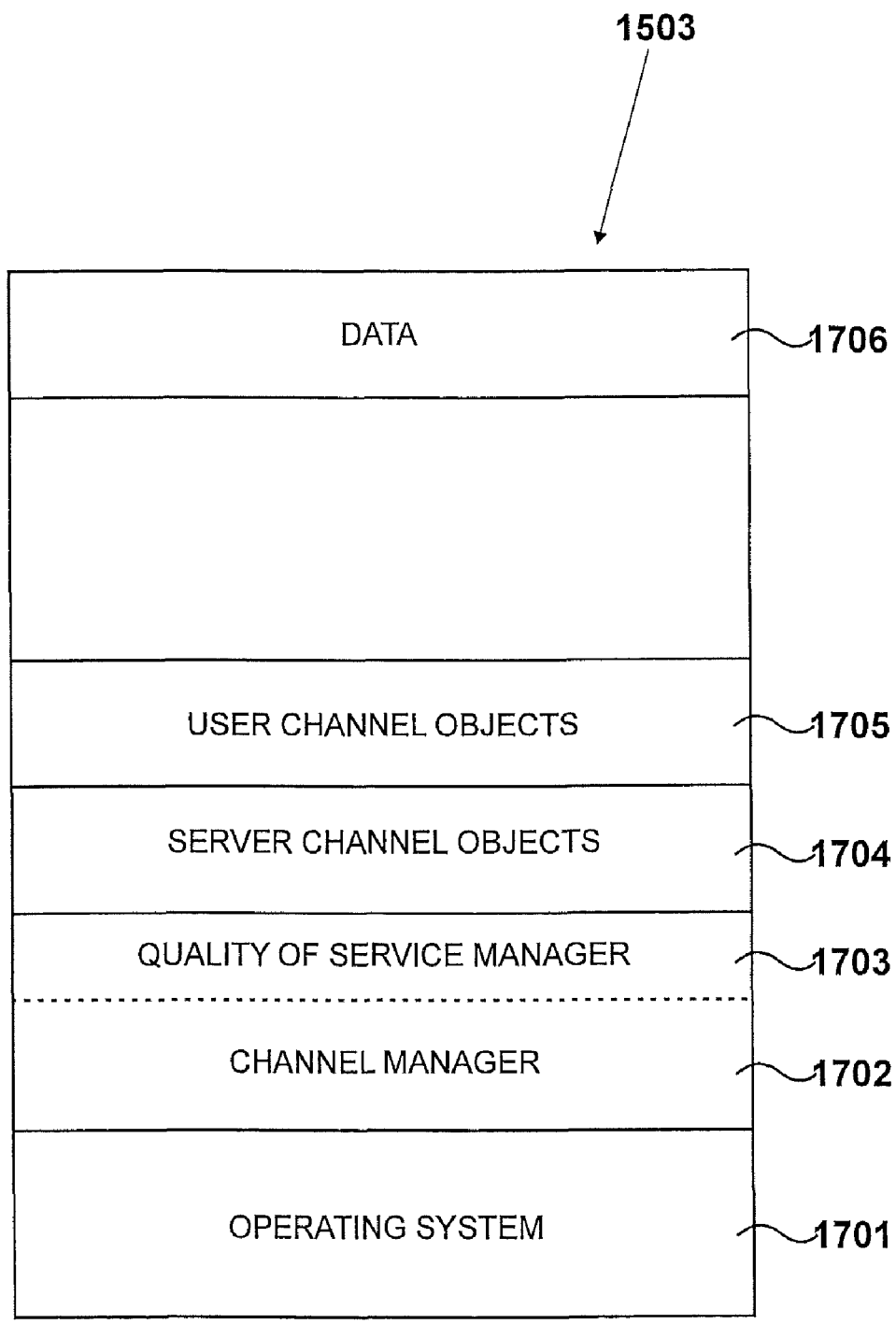
FIG. 17 shows the contents of the memory of the media server shown in FIG. 15.

The contents of main memory 1503 are illustrated in FIG. 17. Operating system 1701 provides operating system instructions for common system tasks and device abstraction. In this example a Windows® Server operating system is used, but another system providing similar functionality could be used. Channel manager 1702 receives requests from media controller 1303 and manages the server channels and user channels. It also includes a Quality of Service manager 1703 that monitors report packets received from terminals. Server channel objects 1704 define server channels 1601 to 1609 while user channel objects 1705 define user channels 1611 to 1614. Data 1706 includes data used by operating system 1701 and channel manager 1702.

FIG. 18

Figure 18:
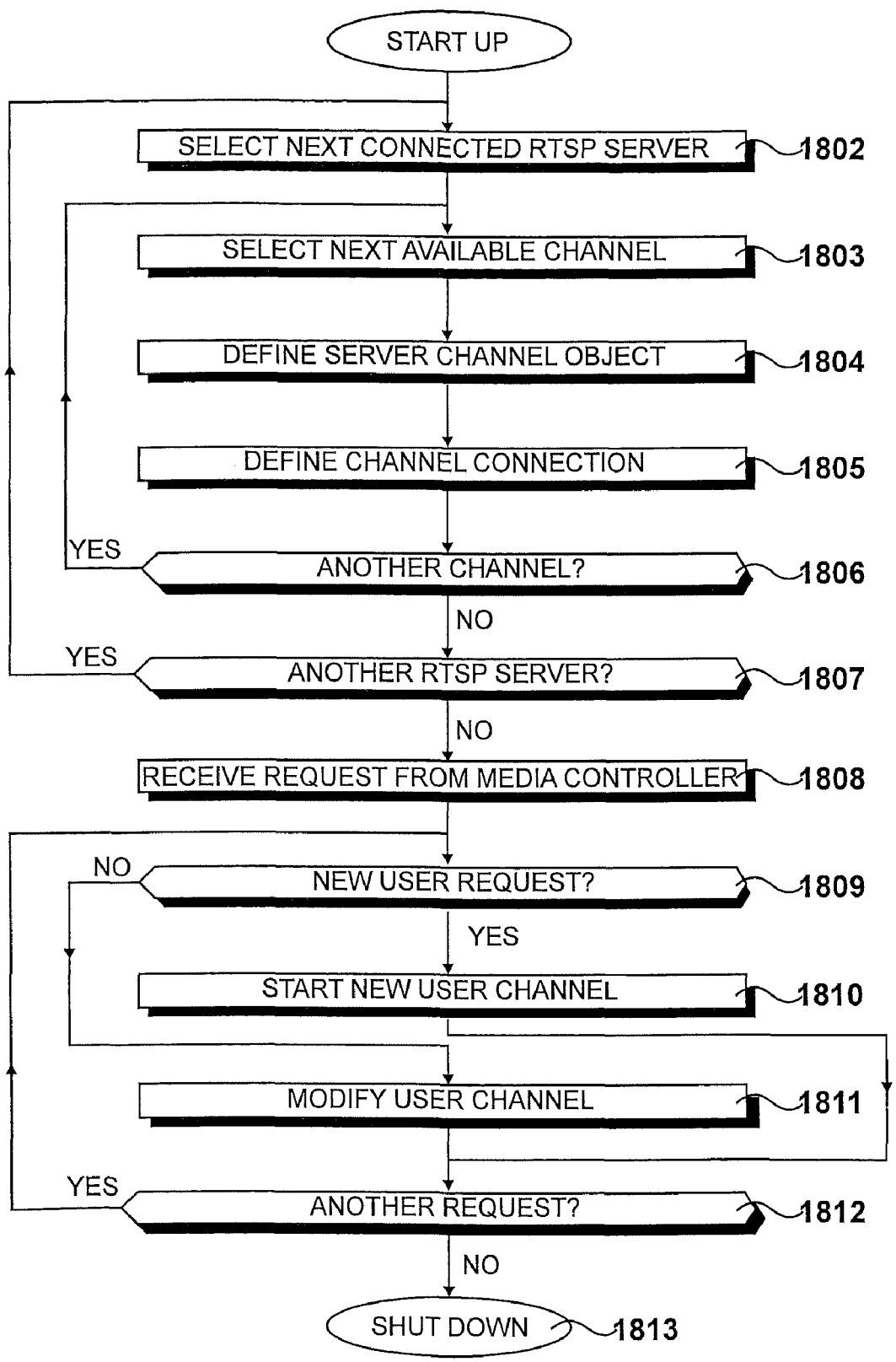
FIG. 18 details steps carried out by a channel manager on the media server shown in FIG. 15.

FIG. 18 details steps carried out by channel manager 1702. At step 1801 it starts up, usually with the switching on of media server 115. At step 1802 the first connected RTSP server is selected and at step 1803 the first channel that the server supplies is selected. At step 1804 a server channel object is defined to receive the data and at step 1805 a communications link is defined between the RTSP server and the server channel as an RTSP client. At step 1806 a question is asked as to whether there is another channel on the server, and if this question is answered in the affirmative then control is returned to step 1803 and the next channel is selected. If it is answered in the negative then at step 1807 a further question is asked as to whether there is another connected RTSP server, and if this question is answered in the affirmative then control is returned to step 1802 and the next server is selected. Alternatively, if the question is answered in the negative then all the necessary server channels have been defined.

Thus at step 1808 a request to play a channel is received from media controller 1303 on content server 114. At step 1809 a question is asked as to whether the request is a CHANNEL PLAY or a CHANNEL CHANGE request. If the answer is PLAY then at step 1810 a new user channel is defined. Alternatively, if it is a CHANGE request then at step 1811 the existing user channel for the requesting terminal is modified. Following either step, a question is asked at step 1812 as to whether another request has been received, and if this question is answered in the affirmative then control is returned to step 1809 and the request is processed. Eventually the question is answered in the negative and channel manager 1702 is shut down at step 1813, usually with the switching off for some reason of media server 115.

FIG. 19

Figure 19:
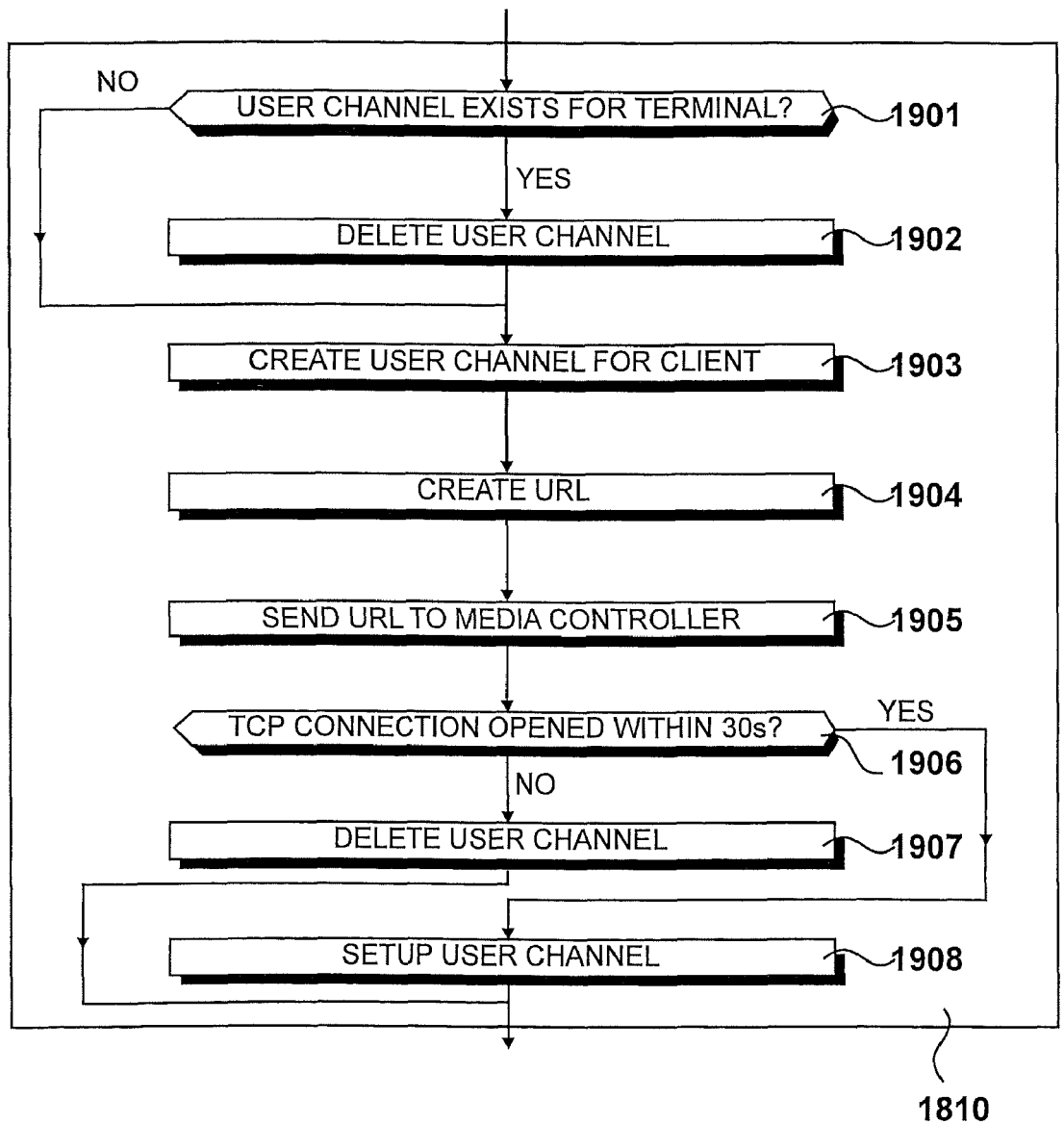
FIG. 19 details steps carried out in FIG. 18 to define a user channel.

FIG. 19 details step 1810 at which a new user channel is defined. At step 1901 a question is asked as to whether a user channel already exists for the requesting terminal. This may happen when a communications link is broken and the terminal needs to renegotiate the link with a new CHANNEL PLAY request, and so if the question is answered in the affirmative then the existing user channel is deleted at step 1902. At this stage, or if the question is answered in the negative, then a user channel is created at step 1903 and at step 1904 a URL is created that indicates either the IP address or a resolvable DNS address of the media server, the TCP port that has been allocated to the user channel, and a filename that will be recognized by the channel manager as indicating the defined user channel. This URL is then returned to the media controller 1303 at step 1905 in order that it can be sent in turn to the requesting terminal. The URL is time limited for security purposes and thus at step 1906 a question is asked as to whether the terminal used the URL to open a TCP connection within thirty seconds and if this question is answered in the negative then at step 1907 the user channel is deleted. Alternatively, the TCP connection is initiated in time and the user channel is set up at step 1908.

FIG. 20

Figure 20:
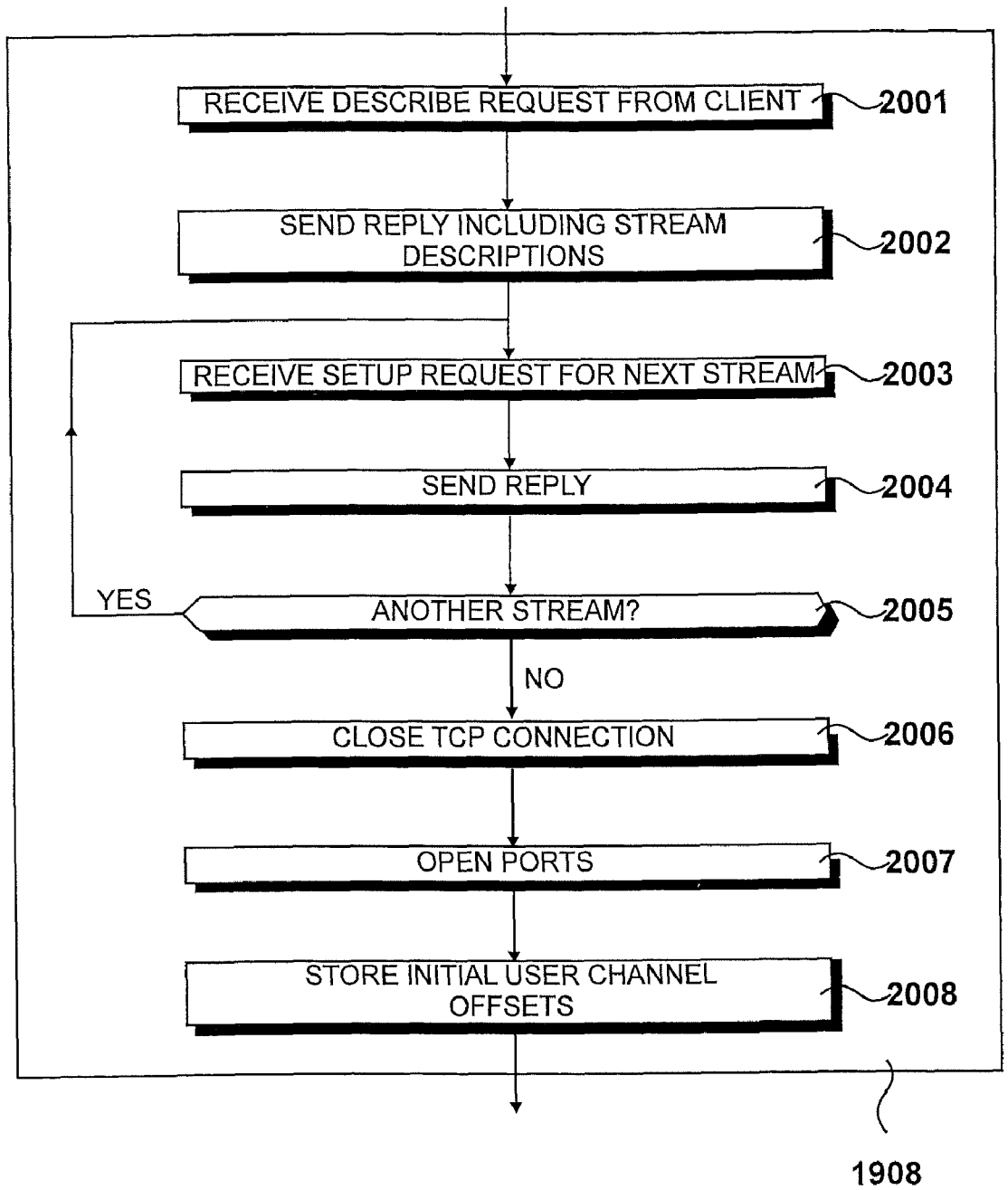
FIG. 20 details steps carried out in FIG. 19 to set up the user channel.

FIG. 20 details step 1908 at which the user channel is set up, mainly by establishing a communications link between the requesting terminal as an RTSP client and the defined user channel as an RTSP server. On the terminal side this is performed by the media player, such as media player 303, carrying out the steps detailed in FIG. 5. Thus at step 2001 the channel manager 1702 receives a DESCRIBE request from the terminal and at step 1703 it sends a reply that includes an indication of the number and type of streams, such as one audio stream and one video stream. At step 2003 a SETUP request is received from the terminal for the first stream, which includes the terminal port numbers that should be used for the first RTP and RTCP data streams. A reply is sent at step 2004 indicating the ports on the media server that the user channel is using for these streams. At step 2005 a question is asked as to whether there is another stream, and if this question is answered in the affirmative then control is returned to step 2003 and a SETUP request is received for that stream. Alternatively, the question is answered in the negative and the TCP connection is closed at step 2006. At step 2007 the necessary ports are opened and at step 2008 initial user channel offsets of zero are stored in the user channel object. This means that the display times contained in the data packets will be offset by zero, ie left unaltered, as will the sequence numbers of the packets.

FIG. 21

Figure 21:
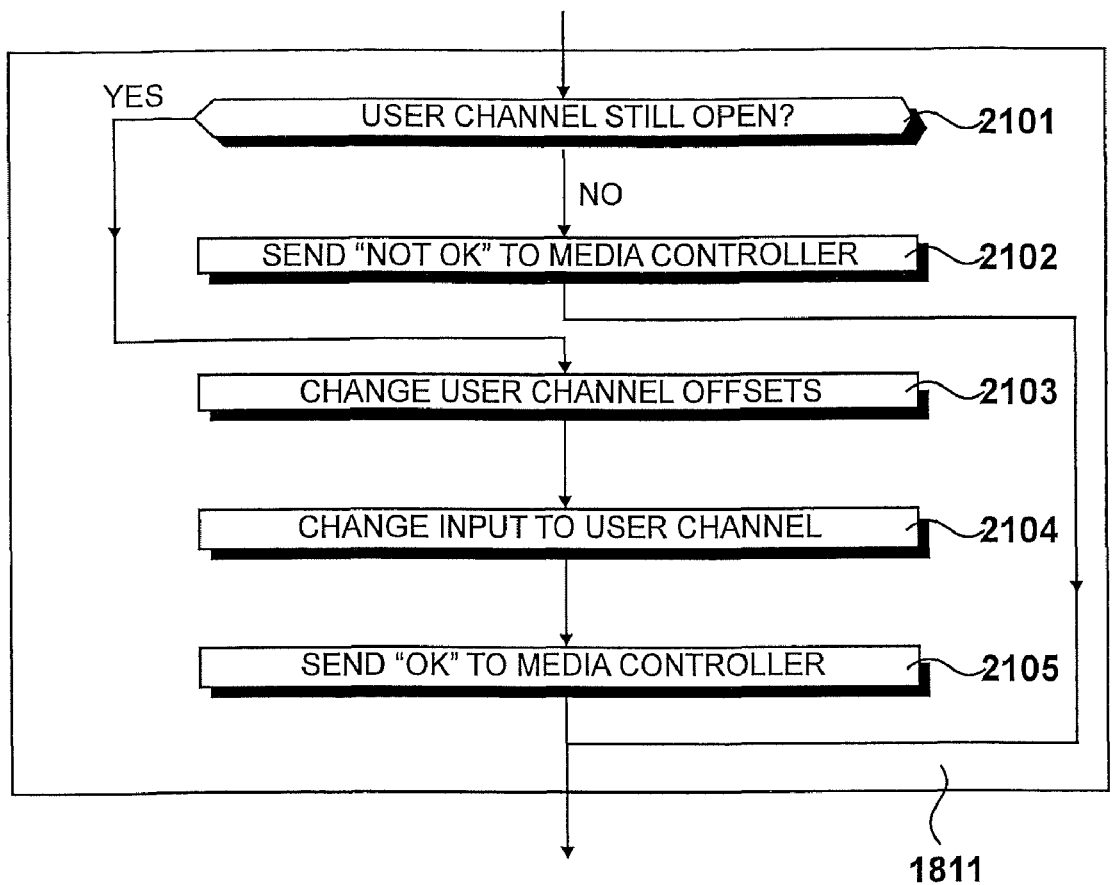
FIG. 21 details steps carried out in FIG. 18 to alter a user channel.

Step 1811 at which a user channel is altered following a CHANNEL CHANGE request is detailed in FIG. 21. At step 2101 a question is asked as to whether the user channel is still open, since it is possible that the channel manager may have closed it due to a long period of inactivity following a broken communications links. If this question is answered in the affirmative then at step 2102 the message "NOT OK" is sent back to media controller 1303 and step 1811 is exited. However, under normal circumstances the user channel is open and sending data to the terminal. Thus at step 2103 the channel offsets, ie the display time offsets and the sequence number offsets, are changed in the user channel object and at step 2104 the input to the user channel is changed to the server channel that has the requested television channel. The message "OK" is then sent to media controller 1303 at step 2105.

FIG. 22

Figure 22:
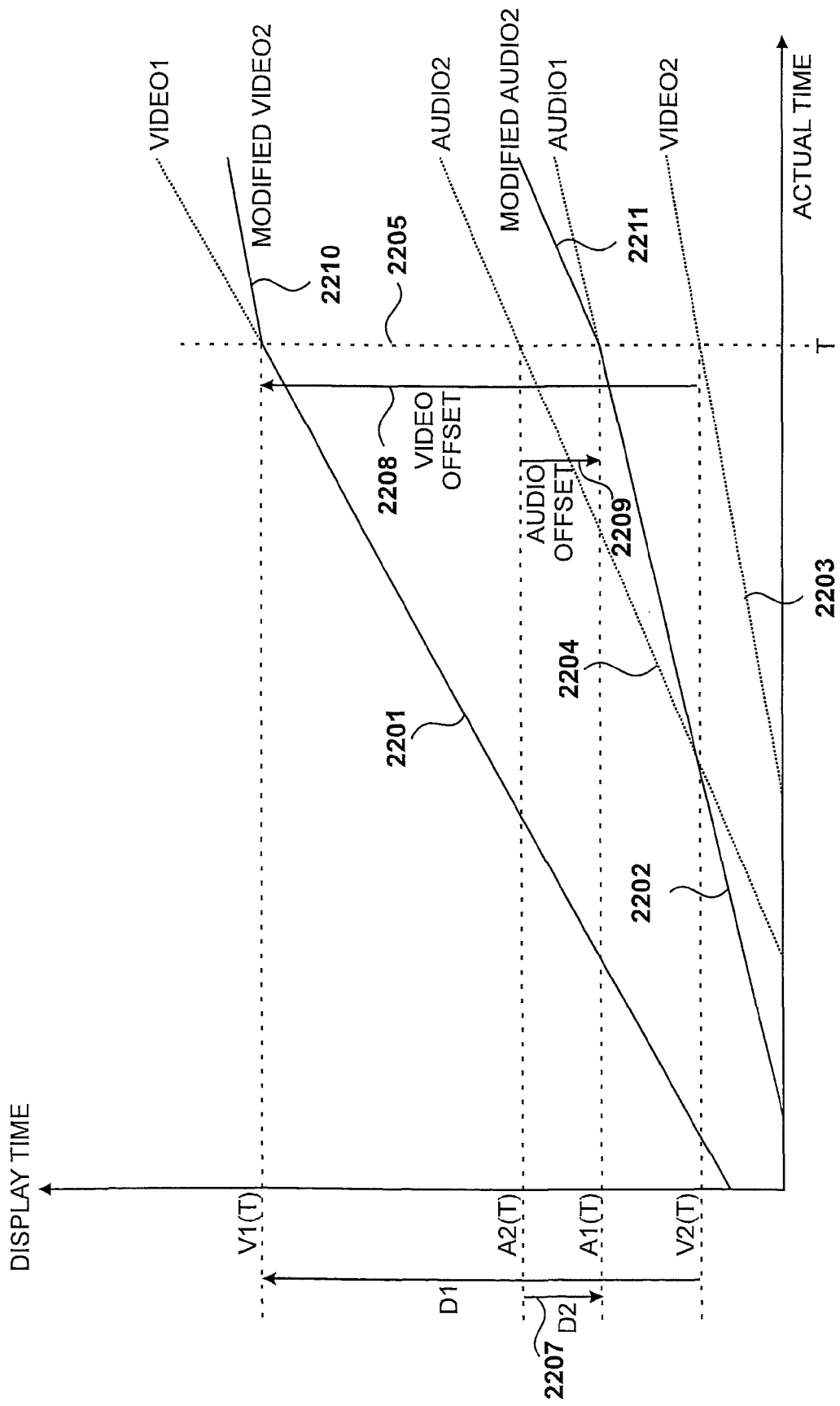
FIG. 22 illustrates the effect of altering the user channel during FIG. 21.

FIG. 22 illustrates the effect of changing the display time offsets at step 2103, which will be described further with respect to FIG. 23. The graph plots server time against display time for four RTP streams, a first video stream 2201 and a first audio stream 2202, which are the streams that are the current input into the user channel, and a second video stream 2202 and a second audio stream 2204, which carry the television channel that the user wishes to change to.

For each of the streams, the display time corresponding to an server time T shown by line 2205 can be calculated from the RTCP packets corresponding to each stream. This is done in this example by extrapolating from the last four RTCP packets for each stream. The difference in display times D1, shown by arrow 2206, between the two video streams and the difference in display times D2, shown by arrow 2207, between the two video streams can then be calculated. D1 is added to the current video offset and D2 is added to the current audio offset, both of which are zero at first set-up of the user channel, to produce a video offset 2208 and an audio offset 2209. Every packet that is sent by the user channel is altered by adding the video offset to the display time in the RTP and RTCP packets for the video stream, and by adding the audio offset to the display time in the RTP and RTCP packets for the audio stream.

Thus the second video stream is offset as shown by line 2210 and the second audio stream is offset as shown by line 2211. The player receiving the packets will thus display them at a modified server time. The gradients of the streams are different, leading to a slight speeding up or slowing down at first, but this will be corrected once two or three RTCP packets have been received by the player. The user will not notice this slight change in speed as long as the audio and video streams are synchronized.

In an embodiment where the client is not able to change the gradient once it has been set, all the streams would have to have the same gradient. In practice, it is likely that servers 116, 117 and 118 will use preset gradients rather than randomly-generated ones and thus all the streams would have the same gradient.

The internal clocks on servers 116, 117 and 118 may not be synchronized, and if this is the case then the server time in data packets originating from different servers will be different. The result of this is that when switching between streams from different servers there may be either a jump backwards or a delay in viewing of the data, which will be equal to the difference between the servers' internal clocks. A jump backwards in time would probably not be noticed unless the server time were extremely inaccurate, but a delay would be noticed and not tolerated by a user. Thus the offsets may need to be augmented to take account of this fact, and this is described further with reference to FIG. 23*a*.

FIG. 23

Figure 23:
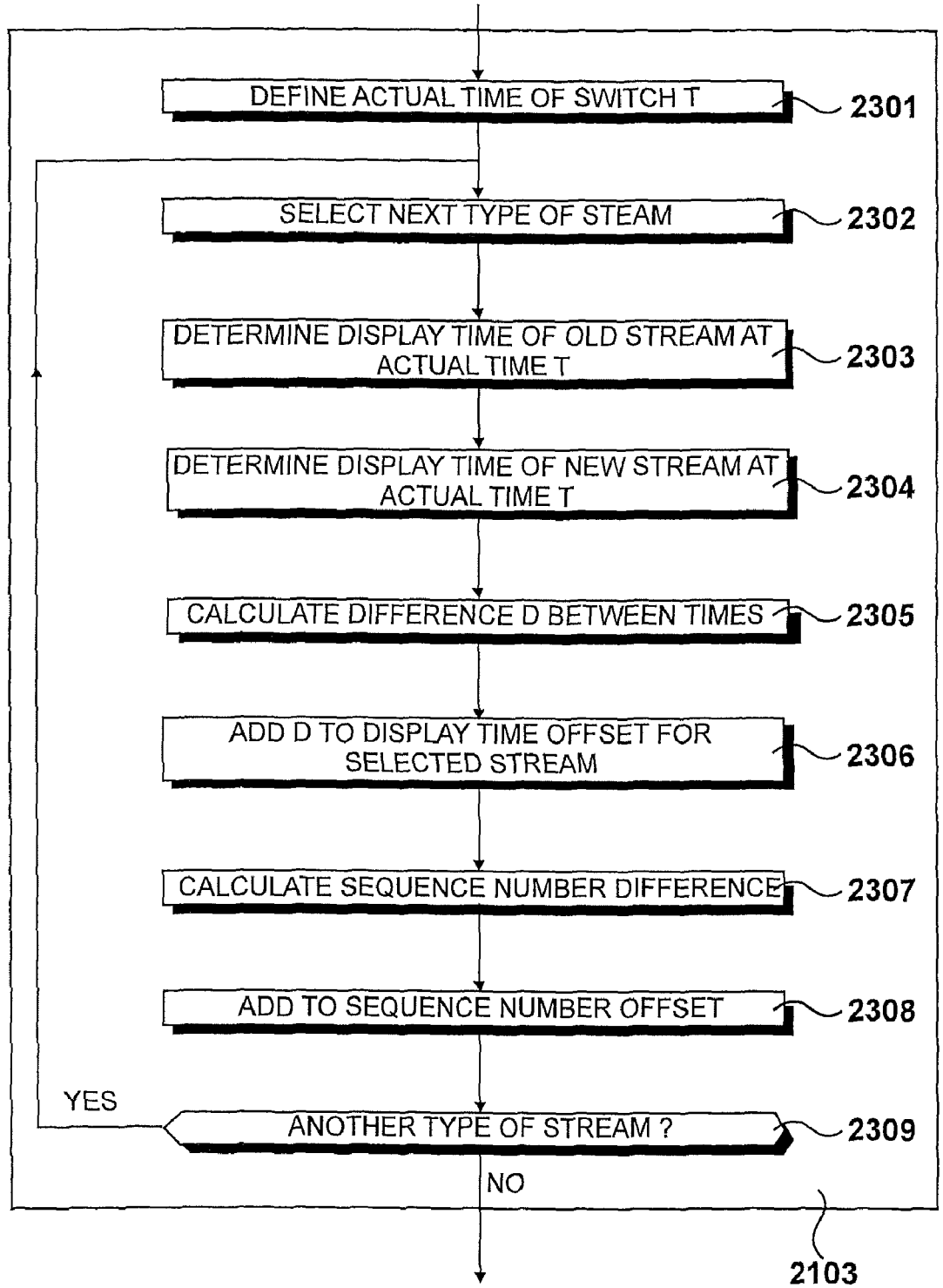
FIG. 23 details steps carried out in FIG. 21 to change display time offsets.
Figure 23A:
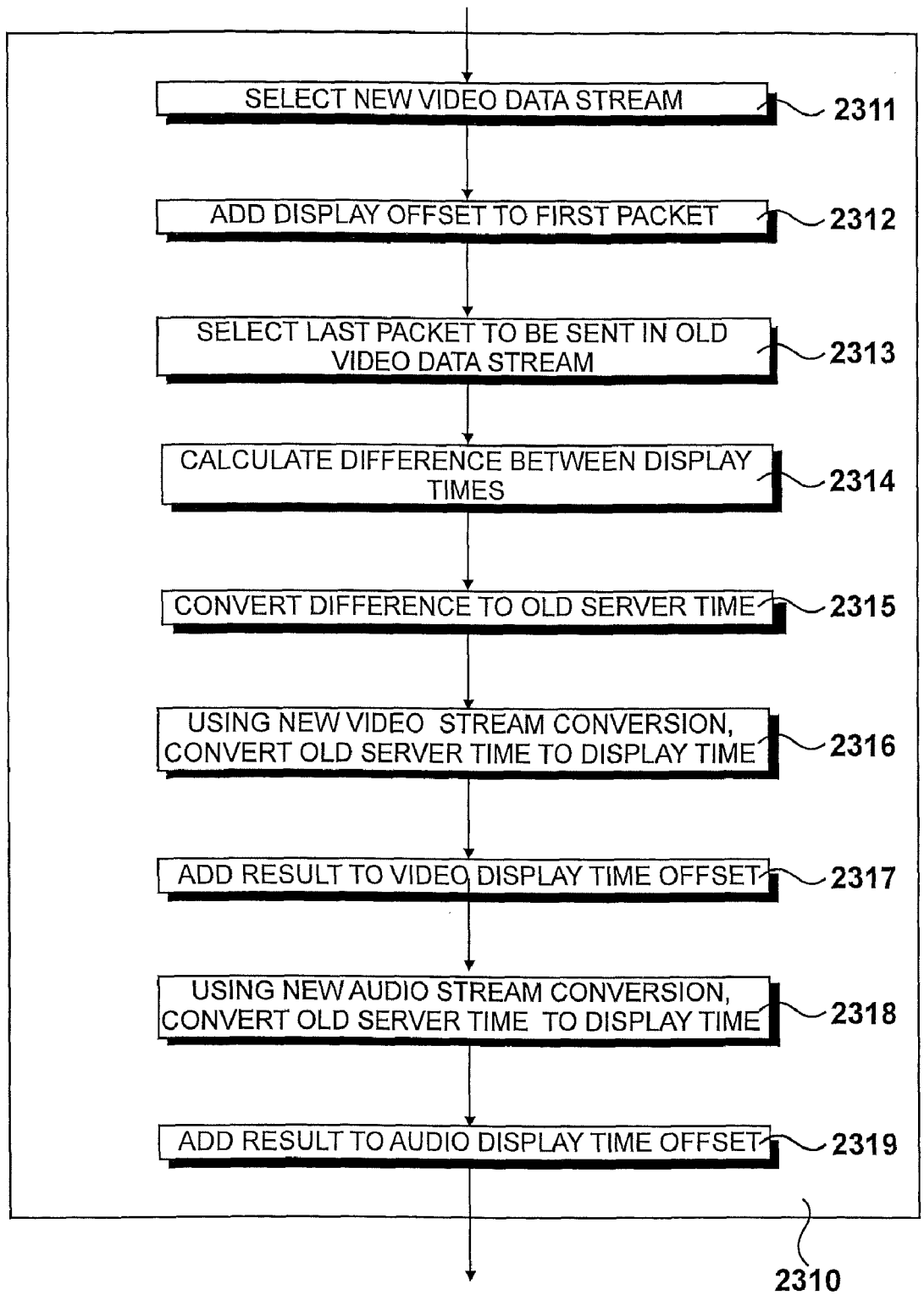
FIG. 23a details steps carried out in FIG. 23 to augment the display time offsets.

FIG. 23 details step 2103 at which the channel offsets are changed as illustrated in FIG. 22. At step 2301 an server time T is defined and at step 2302 a first type of stream, video or audio, is selected. At step 2303 the display time of the stream that is no longer required is calculated for the server time T, and at step 2304 the same is calculated for the new stream. At step 2305 the difference D between the display times is calculated and at step 2306 this difference is added to the current display time offset for the selected stream type. At step 2307 the packet sequence number difference is calculated by subtracting the sequence number of the next packet in the old stream from the sequence number of the next packet in the new stream and adding it to the current sequence number offset for the selected stream type at step 2308.

At step 2309 a question is asked as to whether there is another type of stream and if this question is answered in the affirmative then control is returned to step 2302 and the next type of stream is selected. Alternatively, the question is answered in the negative and at step 2110 both of the display time offsets are augmented.

FIG. 23a

The display time offsets for both the video and audio streams may need to be augmented to take account of different server times. If the old and new channels come from the same server, or servers having synchronized internal clocks, this step will result in no change to the offsets. However, if the channels come from different servers having non-synchronized clocks this step will ensure a smooth transition between channels.

At step 2311 the video stream in the new channel is selected and at step 2312 the calculated display time offset for the video stream is added to it. At step 2313 the last packet that was sent in the old video data stream is selected and at step 2314 the difference between the display time in this last packet and the offset display time in the new packet is calculated. Between two channels with no difference in server time, this difference will be zero, but between channels coming from different, non-synchronized servers, this difference will not be zero.

Thus at step 2315 the difference is converted to a server time using the function for the old video stream, and at step 2316 this server time is converted to display time using the function for the new video stream. The result of this is added to the video display time offset at step 2317. Similarly, at step 2318 the same server time is converted to display time using the function for the new audio stream. The result of this is added to the audio display time offset at step 2319.

This means that for both audio and video, the first data packet in the new stream has the same display time as the last packet in the old stream and thus any difference between server clocks is allowed for.

FIG. 24

Figure 24:
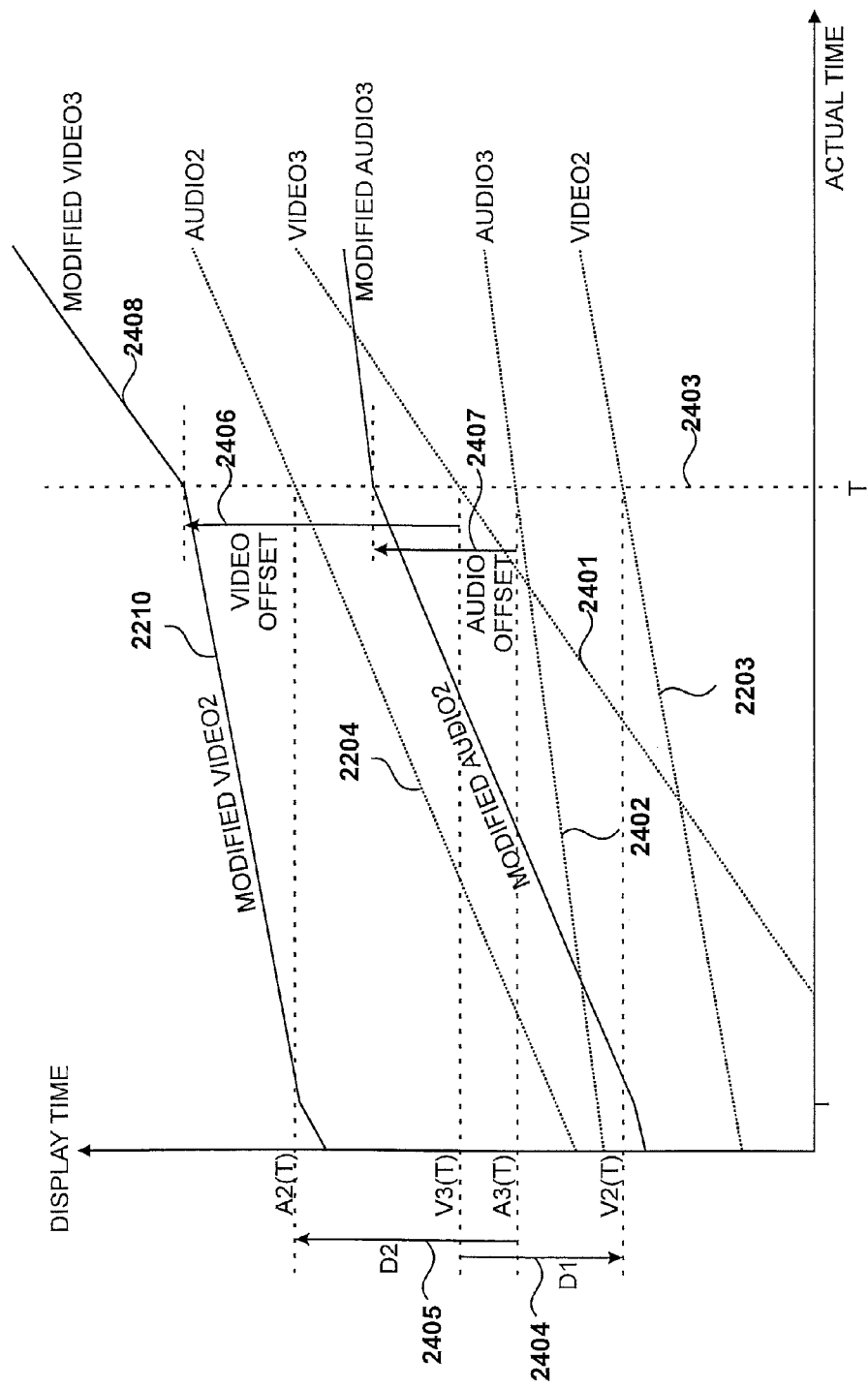
FIG. 24 illustrates the effect of further altering the user channel during FIG. 21.

FIG. 24 shows a further illustration of the changing of display time offsets (assuming that the servers are synchronized and no augmentation is necessary). The input to the user channel has changed to the second video stream 2203 and 2204, but modified data packets are being sent with an offset display time as shown by lines 2210 and 2211. Another CHANNEL CHANGE request has been received and so the input to the user channel will change to third video stream 2401 and third audio stream 2402. Thus at time T, shown by line 2403, the display times for the modified second video and audio streams 2210 and 2211 and the third video and audio streams 2401 and 2402 are calculated. The difference in display times D1, shown by arrow 2404, between the two video streams and the difference in display times D2, shown by arrow 2405, between the two audio streams can then be calculated. D1 is added to the current video offset and D2 is added to the current audio offset to produce a video offset 2406 and an audio offset 2407. Thus the third video stream is offset as shown by line 2408 and the second audio stream is offset as shown by line 2409.

FIG. 25

Figure 25:
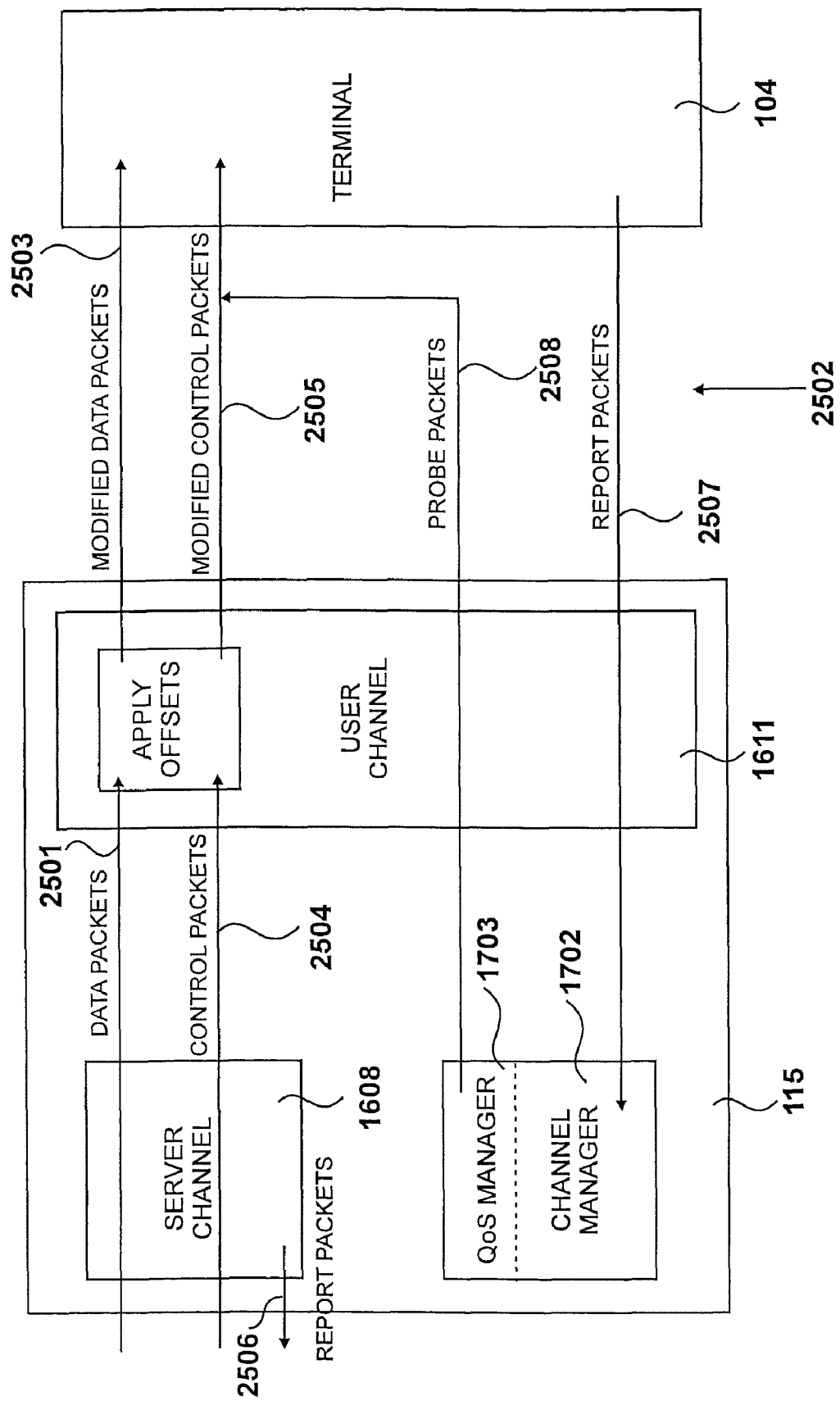
FIG. 25 illustrates the transmission and receipt of data between the media server shown in FIG. 15 and the PDA shown in FIG. 2.

FIG. 25 is a block diagram showing the streams that pass along the communication links. Media server 115 communicates with a terminal, for example PDA 104, using user channel 1611 which is taking input from, for example, server channel 1608. RTP data packets 2501 are received by server channel 1608 from RTSP server 116 and passed to user channel 611, which applies the display time and sequence number offsets and sends them to PDA 104 along communications link 2502 as modified RTP data packets 2503. RTCP control packets 2504 are received by server channel 1608 and passed to user channel 611, which applies the offsets and sends them to PDA 104 along communications link 2502 as modified RTCP data packets 2505.

Server channel 1608 creates RTCP report packets 2506 and sends them to the RTSP server 116. PDA 104 also creates report packets 2507 and sends them via communications link 2502 to user channel 1611, which forwards them to channel manager 1702.

The bandwidth available to communications links over internet 108 fluctuates constantly and thus at any one time the packet loss may be very high or very low. RTCP report packets include an indication of packet loss, expressed as a fraction known as a loss fraction, and Quality of Service (QoS) manager 1703, which is part of channel manager 1702, uses this information to alter the service supplied to PDA 104. If the packet loss is high then there will be many gaps in the audio-visual data being viewed by the user, particularly if keyframes are being lost. The user will probably prefer to view a lower quality version of the television channel than continue with gaps in the viewing. Thus when packet loss is very high a downwards adjustment in quality can be made.

Figure 16:
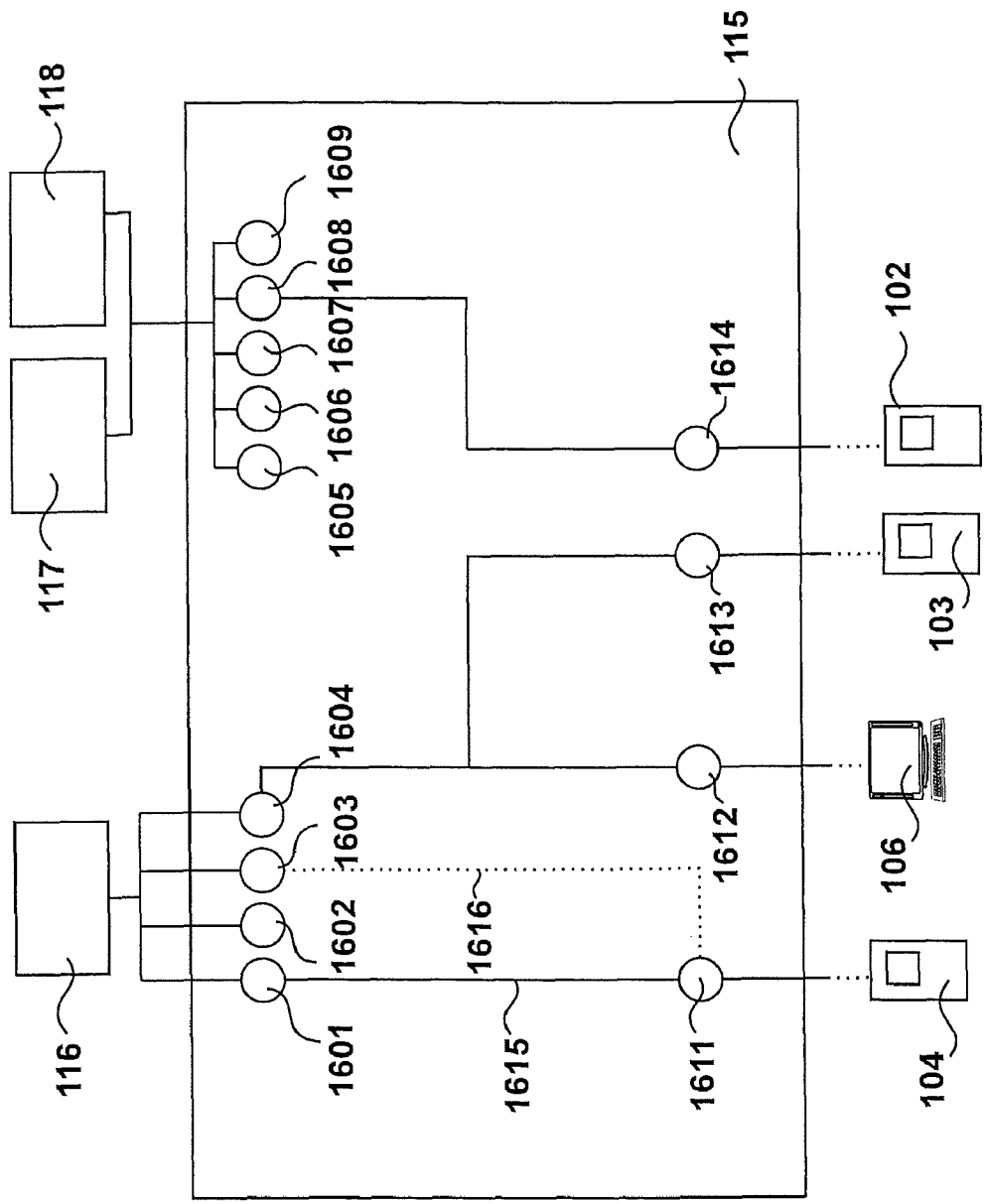
FIG. 16 illustrates how the media server shown in FIG. 15 receives and transmits data.

One way in which this can be performed is by having more than one encoding of each television channel, with each encoding being of a different quality, and thus having a different amount of data. Thus, for example, referring back to FIG. 16, server channel 1601 receives data representing a first television channel encoded at 30 kbits/second, server channel 1602 receives the same television channel but encoded at 50 kbits/second, and server channel 1603 receives the same television channel but encoded at 100 kbits/second. Thus each server channel receives audio-visual data representing the same information, ie the same television channel, with each audio-visual data being encoded at a different data rate. Because the method of channel switching described herein provides virtually seamless switching, it is possible to step down, ie switch from a higher encoding to a lower encoding, transparently to the user. Thus first audio-visual data containing first information encoded at a first data rate and second audio-visual data containing first information encoded at a second data rate that is less than the first data rate are received. The first audio-visual data is provided to a network-connected terminal, before a condition to the effect that the amount of data being sent to the terminal exceeds the available bandwidth is identified. Provision of the first audio-visual data to the terminal is stopped and the second audio-visual data is provided instead.

However, because of the nature of the Internet 108 it is extremely likely that temporary high packet loss will occur occasionally, leading to a step down in quality. It is therefore necessary to step up, ie switch from a lower encoding to a higher encoding, should packet loss be very low. Thus a condition to the effect that the amount of data being sent to the terminal is less than the available bandwidth is identified, provision of the second audio-visual data to the terminal is stopped, and the first audio-visual data is provided again to the terminal.

However, low packet loss only indicates that the current amount of data is acceptable. For example, if data is being sent at 50 kbits/second and there is 70 kbits/second of available bandwidth then packet loss will be low, but attempting to increase the data to 100 kbits/second will result in extreme packet loss and, contrary to intentions, a degradation of quality for the user. Thus instead of stepping up immediately, QoS manager 1703 sends probe packets 2508, which contain dummy data, to the same ports on the receiving terminal as the RTCP packets. They are discarded by the media player because they are not RTCP packets. By increasing the number of probe packets 2508 sent until the total amount of data being transmitted is equal to the amount required by the higher encoding, QoS manager 1703 can ensure that the bandwidth required is available before stepping up. Thus the difference between the data rates of the first and second audio-visual data is calculated, a condition to the effect that the difference is larger than a specified threshold is identified, and additional data packets are sent to the terminal to determine whether the available bandwidth is large enough to provide the first audio-visual data to the terminal.

FIG. 26

Figure 26:
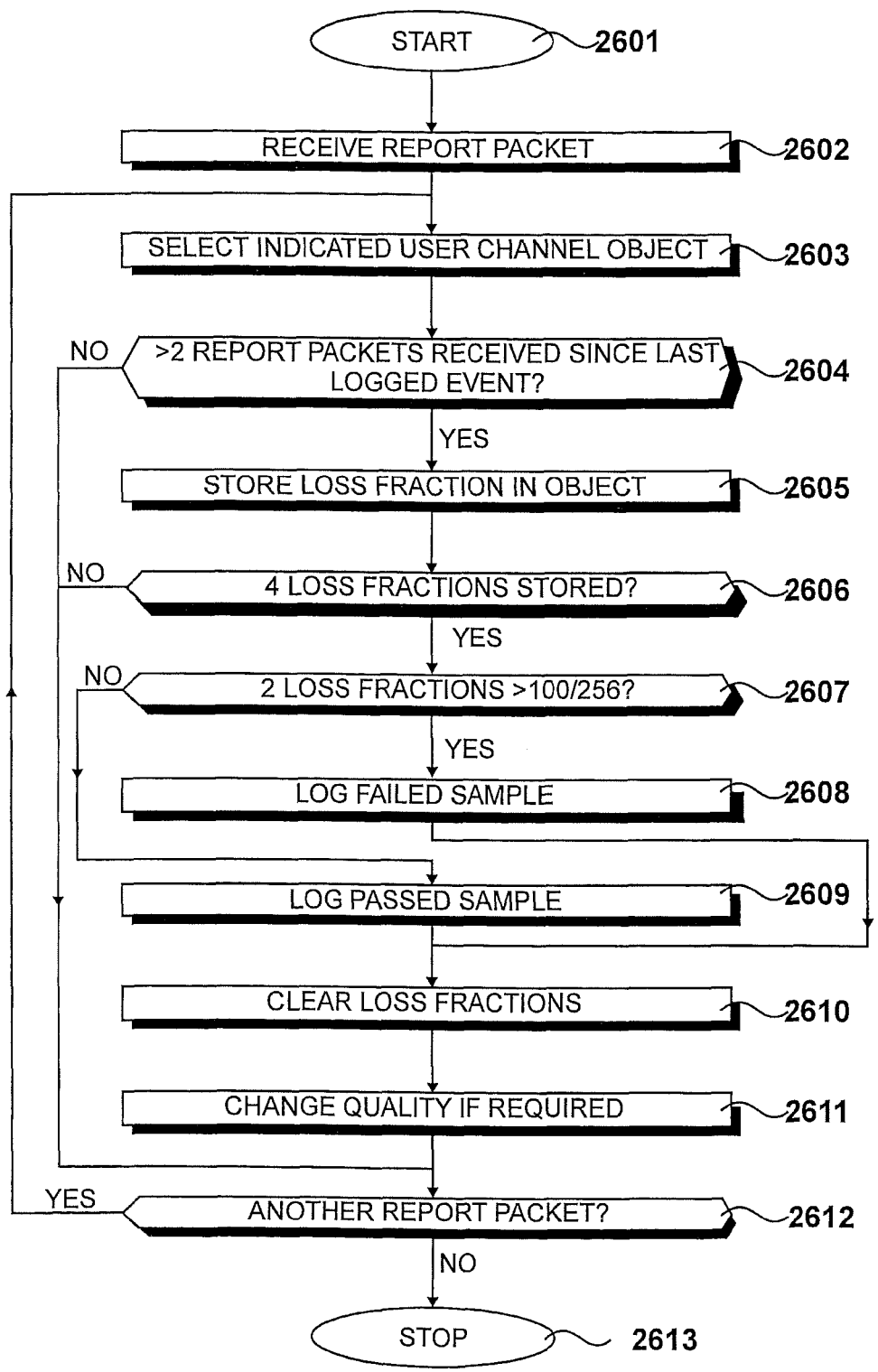
FIG. 26 details steps carried out by a Quality of Service manager on the media server shown in FIG. 15.

FIG. 26 shows the steps carried out by QoS manager 1703. At step 2601 it starts up when channel manager 1702 starts and at step 2602 a report packet is received from a user channel. At step 2603 the corresponding user channel object is selected and at step 2604 the data in the object is examined to determine whether more than two report packets have been received since the last logged event. An event may be a step down in quality, a step up, or a failed attempt to step up. The loss fraction in the first two report packets after an event tends to be distorted by the event and so they are not considered. Thus if the question asked at step 2604 is answered in the affirmative then at step 2605 the loss fraction contained in the report packet is stored in the user channel object.

Loss fractions are examined in samples of four and so at step 2606 a question is asked as to whether there are four loss fractions stored in the user channel object, and if this question is answered in the affirmative then a further question is asked as to whether two of the loss fractions are greater than $100/256$. If this question is answered in the affirmative then at step 2608 a failed sample is logged, whereas if it is answered in the negative a passed sample is logged at step 2609. In either case, the loss fractions are cleared from the object in order to start a new sample.

The quality of the channel is then changed if appropriate at step 2611 and at step 2612 a question is asked as to whether there is another report packet. This step also follows an answer in the negative to the question asked at step 2604 or step 2606. If it is answered in the affirmative then control is returned to step 2603. Eventually it is answered in the negative and the manager terminates at step 2613, usually with the switching off for some reason of media server 115.

FIG. 27

Figure 27:
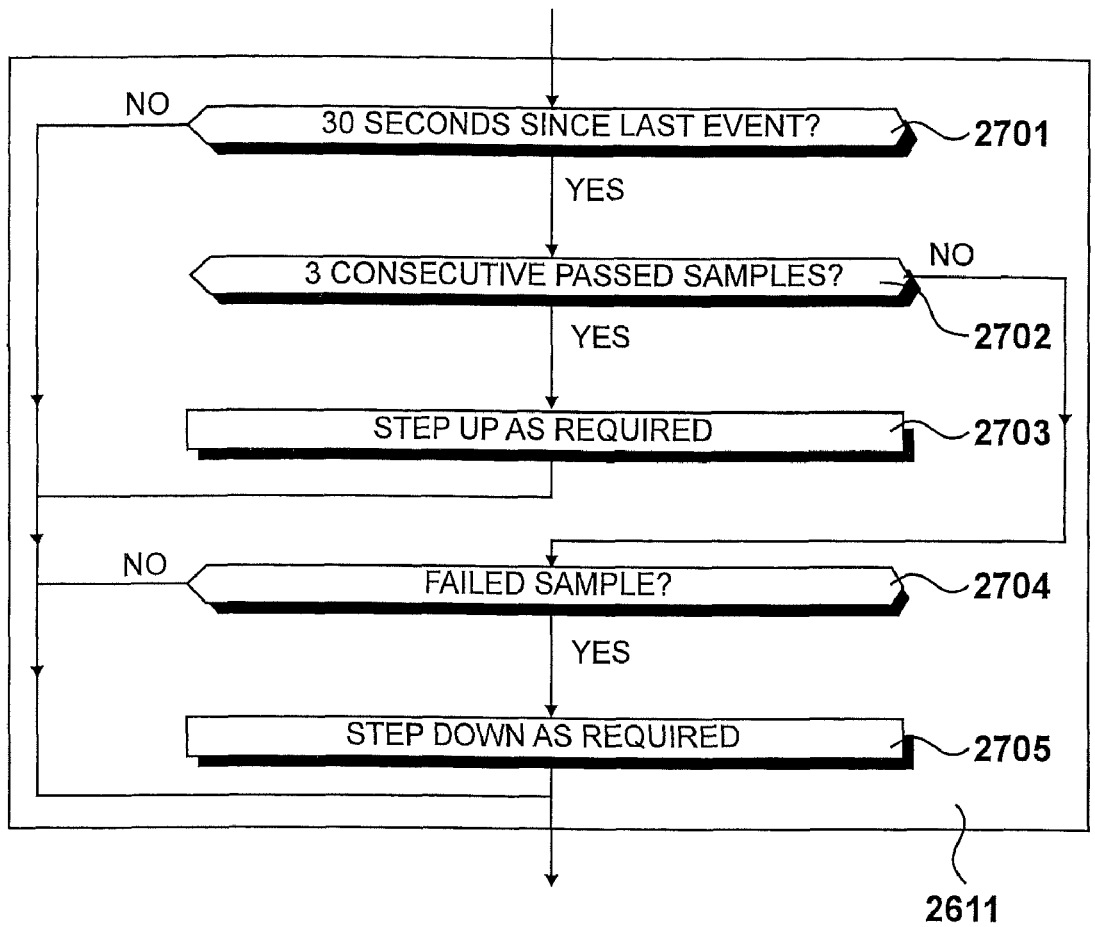
FIG. 27 details steps carried out in FIG. 26 to change the quality of a television channel.

FIG. 27 details step 2611 at which the quality of the channel is changed if appropriate. At step 2701 a question is asked as to whether a period of time, in this example at least thirty seconds, has lapsed since the last event, again because events can distort the data. If this question is answered in the affirmative then at step 2702 a question is asked as to whether there have been three consecutive passed samples. If this question is answered in the affirmative then a step up in quality may be appropriate and this is carried out at step 2703. Alternatively, if the question asked at step 2702 if this question is answered in the negative then a further question is asked at step 2704 as to whether the last sample failed. If this question is answered in the affirmative then a step down in quality may be appropriate and this is carried out at step 2705. If this question or the question asked at step 2701 is answered in the negative then no change in quality is made.

FIG. 28

Figure 28:
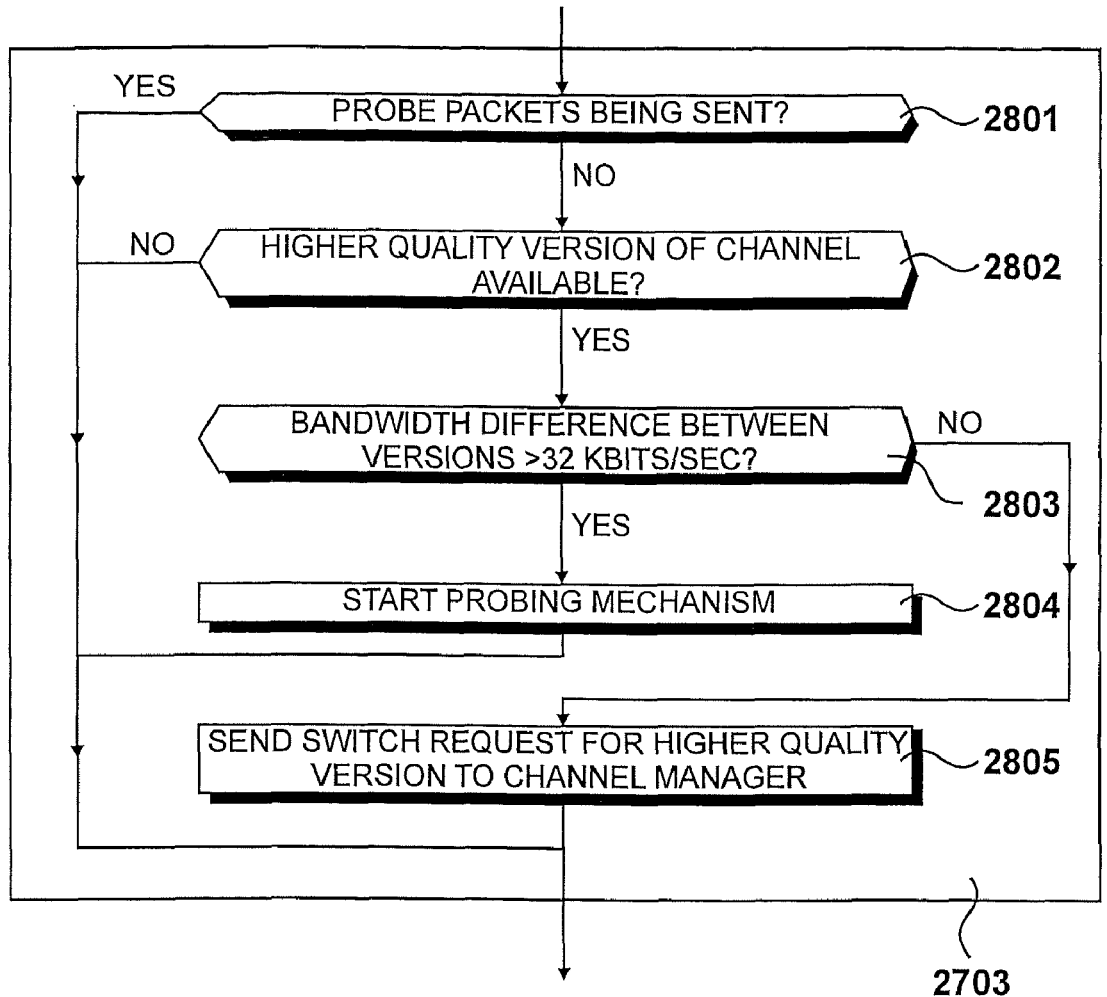
FIG. 28 details steps carried out in FIG. 27 to step up the quality.

FIG. 28 details step 2703 at which a step-up in quality may be carried out. If there have been three consecutive passed samples then clearly the current amount of data being sent on the communications link is getting through and there may be bandwidth for more data, and thus a higher quality of picture, both audio and video, could be shown. If the jump in the amount of data between encodings is not very large then an attempt at stepping up could be made, since the likelihood of stepping far beyond the packet rate that can be supported is low, and even if the new rate cannot be supported a step back down can be made without having degraded the user experience significantly. Alternatively, probe packets are sent to check the available bandwidth.

Thus at step 2801 a question is asked as to whether probe packets are currently being sent. If this question is answered in the negative then at step 2802 a question is asked as to whether a higher-quality encoding of the television channel is available. If this question is answered in the negative then there is no need to pursue the question of stepping up and so step 2703 is terminated. However, if it is answered in the affirmative then at step 2803 a further question is asked as to whether the difference in bandwidth between the current encoding and the higher-quality encoding is greater than 32 kbits/second. If this question is answered in the affirmative then the sending of probe packets 2708 is commenced at step 2804, as will be described further with reference to FIG. 30. Alternatively, if the question is answered in the negative then the difference between encodings is small enough to attempt a speculative step-up and thus at step 2805 a CHANNEL CHANGE request for the higher-quality encoding is sent to channel manager 1702, which processes it in the same way as any other CHANNEL CHANGE request.

FIG. 29

Figure 29:
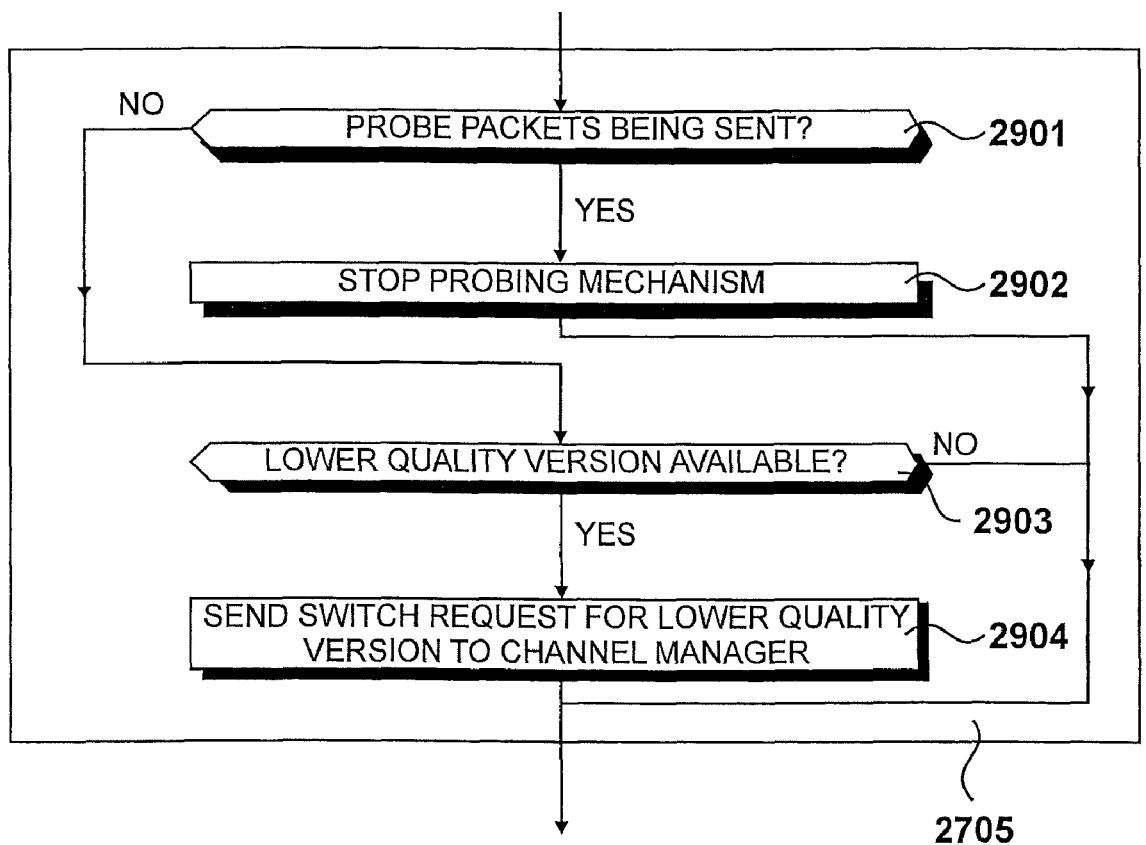
FIG. 29 details steps carried out in FIG. 27 to step down the quality.

FIG. 29 details step 2705 at which a step down in quality may be made. At step 2901 a question is asked as to whether probe packets are currently being sent. If this question is answered in the affirmative then the failed sample means that a step up will not be possible and thus at step 2902 the probe packets are stopped by terminating the process described with reference to FIG. 30. However, if it is answered in the negative then at step 2903 a further question is asked as to whether a lower-quality encoding of the television channel is available. If this question is answered in the negative then nothing can be done about the packet loss and step 2705 is terminated. However, if it is answered in the affirmative then at step 2904 a CHANNEL CHANGE request for the lower-quality encoding is sent to channel manager 1702, which processes it in the same way as any other CHANNEL CHANGE request.

Thus a failed sample results in the cessation of probe packets if they are being sent, or in a step down in quality if they are not being sent

FIG. 30

Figure 30:
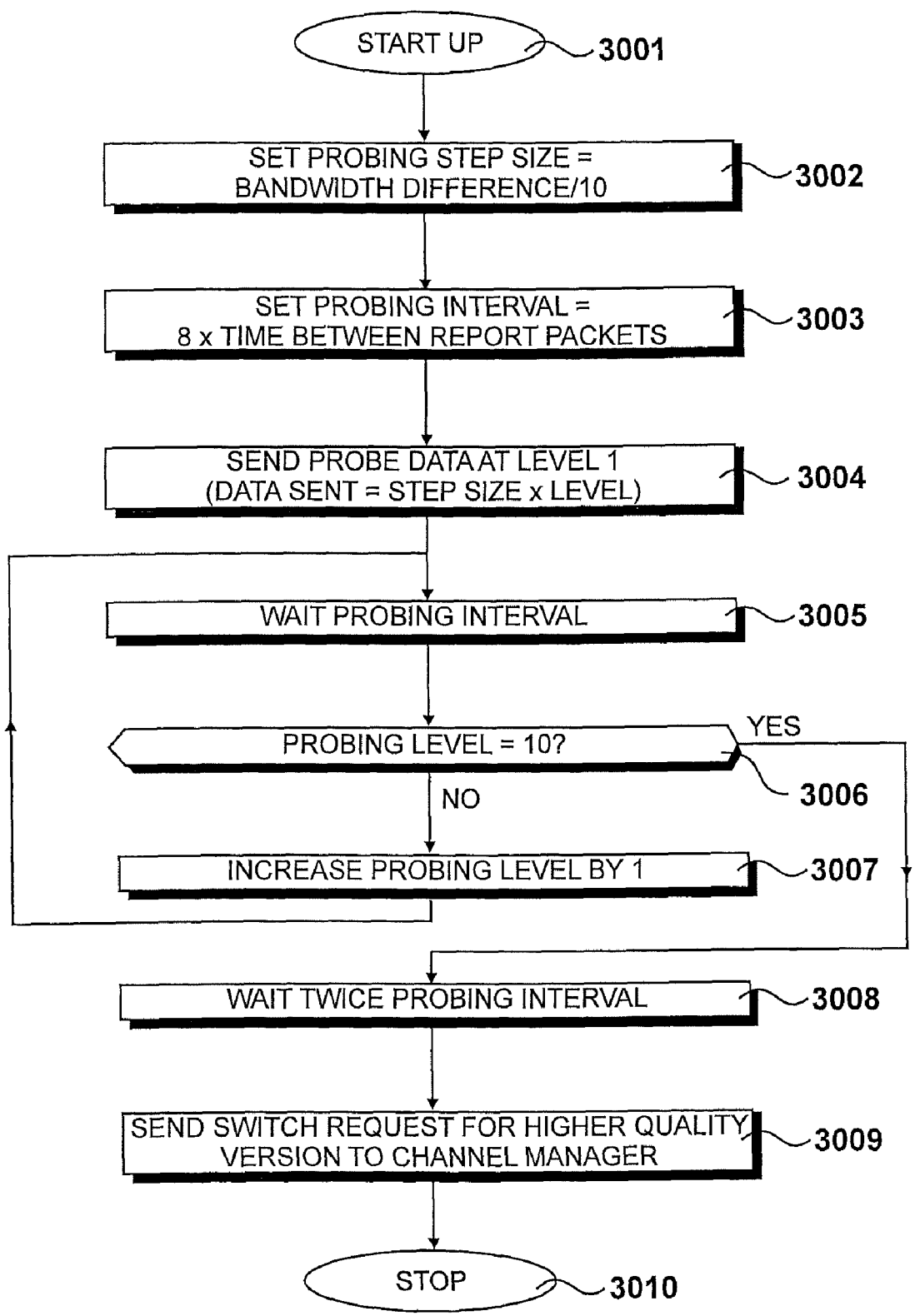
FIG. 30 details a probing procedure.

FIG. 30 illustrates the probing mechanism, which is a separate thread on QoS manager, and which is started at step 2804 after three consecutive passed samples when the difference in bandwidth between versions is greater than 32 kbits/second. Thus at step 3001 the mechanism is started. At step 3002 a step size is calculated to be one tenth of the difference in bandwidth between the versions, and at step 3003 a probing interval is calculated as eight times the average time between receipt of report packets. At step 3004 the probing starts by sending dummy data that increases the bandwidth used by a number of step sizes, called the level. Probing starts at level one.

The process then waits at step 3005 for the calculated probing interval before asking the question at step 3006 as to whether level ten of probing has been reached yet. If this question is answered in the negative then the level is increased by one at step 3007 and control is returned to step 3005 where the process again waits. Eventually the question asked at step 3006 is answered in the affirmative, to the effect that level ten has been reached. This means that the amount of bandwidth required by the probe data plus the current version is equal to the amount of bandwidth required by the higher quality version. The process waits at step 3008 for twice the probing interval to ensure that this bandwidth is sustainable before sending a CHANNEL CHANGE request for the higher-quality encoding to channel manager 1702 at step 3009, which processes it in the same way as any other CHANNEL CHANGE request. The process then terminates at step 3010.

Alternatively, should a failed sample be logged at any time then the QoS manager will terminate the probing process at step 2902.

FIG. 31

Figure 31:
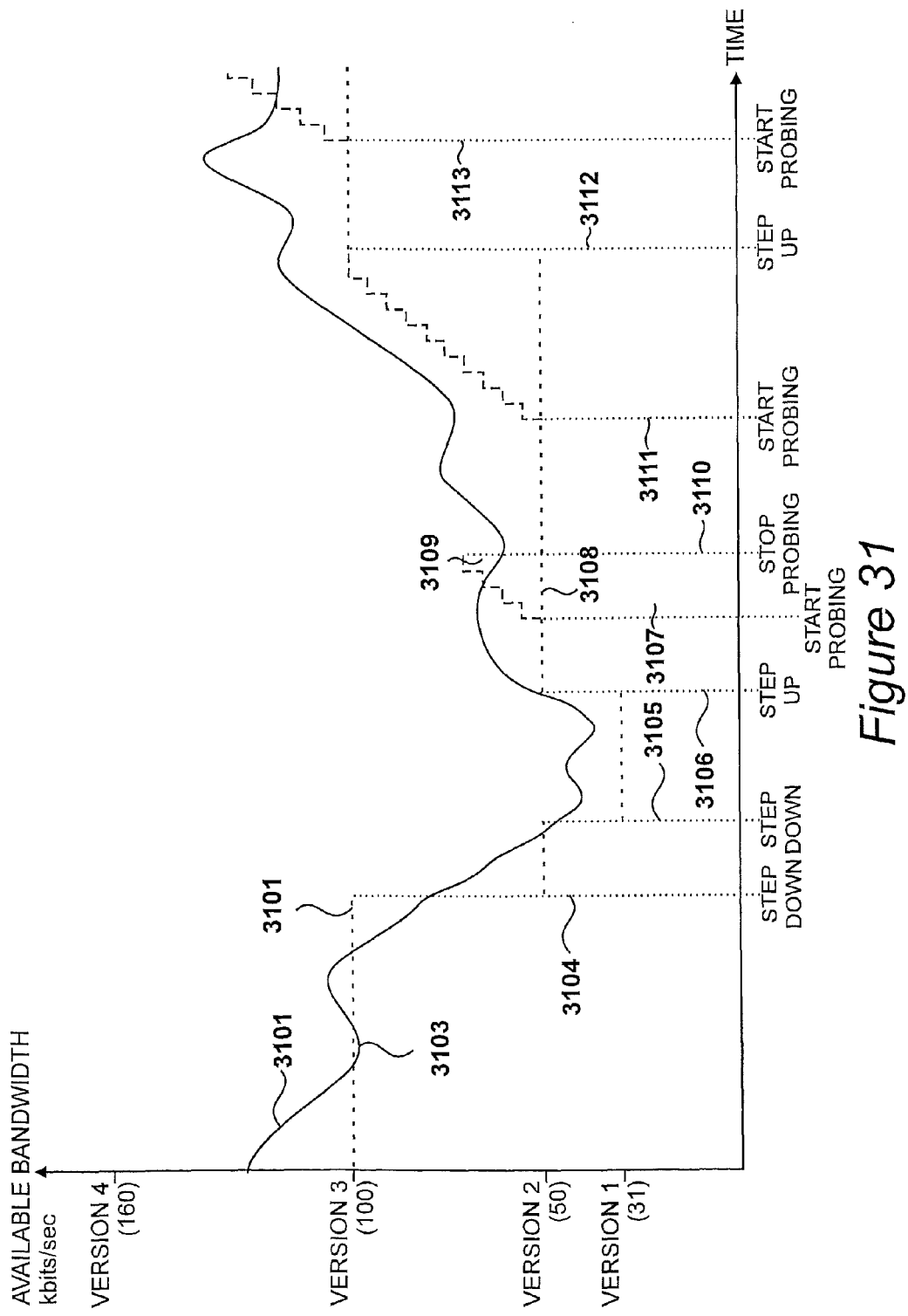
FIG. 31 illustrates steps up and steps down in response to available bandwidth.

FIG. 31 illustrates how the QoS manager 1703 responds to changes in available bandwidth, indicated by the packet loss fraction, by stepping up or stepping down the quality of the television channel supplied to a terminal. The line 3101 plots available bandwidth in kbits/second against time. Four encodings of the same channel are available and are shown on the bandwidth axis according to how much bandwidth they require. The first encoding is at 30 kbits/second, the second at 50 kbits/second, the third at 100 kbits/second and the fourth at 160 kbits/second.

At first, as shown by line 3102, the third encoding at 100 kbits/second is transmitted. The available bandwidth 3101 starts to fall, and indeed at point 3103 falls below 100 kbits/second but not for long enough to produce a failed sample. However, at time 3104 a failed sample leads to a step-down in quality to the second encoding at 50 kbits/second. As the bandwidth 3101 continues to fall a further step-down is made at time 3105 to the lowest-quality encoding at 30 kbits/second.

The bandwidth starts to improve and three consecutive passed samples at time 3106 lead to a step-up in quality to 50 kbits/second. Since the difference between the encodings is only 20 kbits/second a speculative step-up rather than probe data is possible. At time 3107 probing starts, and thus while the amount of RTP/RTCP data being sent is still at 50 kbits/second, as shown by line 3108, the total data sent over the communications link is higher, as shown by line 3109. However, the available bandwidth 3101 is not high enough and thus at time 3110 a failed sample means that the probing is stopped. Probing starts again at time 3111 and this time is successful, resulting in a step up to the third encoding at 100 kbits/second at time 3112. The bandwidth continues to rise and thus at time 3113 probing starts again in order to test the possibility of a step up to the highest encoding.

The invention claimed is:

1. A method of providing audio-visual data over a network, comprising the steps of:
   receiving first audio-visual data containing first information encoded at a first data rate, and second audio-visual data containing first information encoded at a second data rate that is higher than said first data rate, wherein each of said audio-visual data comprises a plurality of packets, and each said packet includes a display time;
   providing said first audio-visual data to a network-connected terminal;
   identifying a condition that the amount of data being sent to said terminal is less than the available bandwidth;
   calculating the difference between the data rates of said first and second audio-visual data;
   sending additional data packets to said terminal to determine whether the available bandwidth is large enough to provide said first audio-visual data to said terminal; and
   if it is determined that the available bandwidth is large enough, stopping provision of said first audio-visual data to said terminal and providing said second audio-visual data to said terminal, wherein:
   a display time offset is calculated, and
   said display time offset is applied to the display time in each packet in said second audio-visual data to create modified packets, such that the display time in each modified packet in said second audio-visual data matches the display time in the expected packets in said first audio-visual data.

2. A method according to claim 1, wherein the step of sending additional data packets to said terminal comprises the steps of:
   defining a first amount of data and sending additional data packets, the sum of the data in each additional data packet being equal to said first amount of data; and
   gradually increasing the amount of data sent until the additional amount of data being sent is equal to said difference.

3. A method according to claim 2, wherein said step of gradually increasing the amount of data sent comprises increasing the amount of data in each additional data packet.

4. A method according to claim 2, wherein said step of gradually increasing the amount of data sent comprises increasing the number of additional data packets sent.

5. A method according to claim 1, further comprising the steps of:
   identifying a condition that said difference is smaller than a specified threshold, and
   stopping provision of said first audio-visual data and providing second audio-visual data to said terminal without sending additional data packets.

6. A method according to claim 1, further comprising the steps of, after the sending of additional data packets has commenced:
   identifying a condition that the amount of data being sent to said terminal exceeds the available bandwidth; and
   stopping said additional data packets.

7. A method according to claim 1, wherein said step of identifying a condition that the amount of data being sent to the terminal is less than the available bandwidth comprises the steps of:
   monitoring a measurement of packet loss; and
   identifying when said measurement of packet loss falls below a second specified threshold.

8. A method according to claim 7, wherein said measurement of packet loss is a sample of four loss fractions, wherein each of said loss fractions is contained within a report packet received from said network-connected terminal and represents a percentage of recent packets that have not been received by said network-connected terminal.

9. A method according to claim 8, wherein said measurement of packet loss falls below said second specified threshold when three consecutive samples are passed, wherein a passed sample contains three loss fractions that do not exceed $^{100}/_{256}$.

10. A method according to claim 1, further comprising the steps of, subsequent to said second audio-visual data being provided to said network-connected terminal:
identifying a condition that the amount of data being sent to said terminal is greater than the available bandwidth;
stopping provision of said second audio-visual data to said terminal; and
providing said first audio-visual data to said terminal.

11. A method according to claim 10, wherein said step of identifying a condition that the amount of data being sent to the terminal is greater than the available bandwidth comprises the steps of:
monitoring a measurement of packet loss; and
identifying when said measurement of packet loss exceeds a first specified threshold.

12. A method according to claim 11, wherein said measurement of packet loss is a sample of four loss fractions, wherein each of said loss fractions is contained within a report packet received from said network-connected terminal and represents a percentage of recent packets that have not been received by said network-connected terminal.

13. A method according to claim 12, wherein said first specified threshold is exceeded when two out of said four loss fractions exceed $^{100}/_{256}$.

14. A method according to claim 1 further comprises applying a sequence number offset to the sequence number of each packet in said second audio-visual data.

15. Apparatus for providing data over a network, comprising a processor, memory, a first network connection and a second network connection, wherein said processor is configured to:
receive, via said first network connection, first audio-visual data containing first information encoded at a first data rate, and second audio-visual data containing first information encoded at a second data rate that is higher than said first data rate, wherein each of said audio-visual data comprises a plurality of packets, and each said packet includes a display time;
provide, via said second network connection, said first audio-visual data to a network-connected terminal;
identify said condition that the amount of data being sent to the terminal is less than the available bandwidth;
calculate the difference between the data rates of said first and second audio-visual data;
send additional data packets to said terminal to determine whether the available bandwidth is large enough to provide said first audio-visual data to said terminal; and
if it is determined that the available bandwidth is large enough, stop provision of said first audio-visual data to said terminal and provide said second audio-visual data to said terminal, wherein:
a display time offset is calculated, and
said display time offset is applied to the display time in each packet in said second audio-visual data to create modified packets, such that the display time in each modified packet in said second audio-visual data matches the display time in the expected packets in said first audio-visual data.

16. Apparatus according to claim 15, wherein said processor is configured to send additional data packets to said terminal by:
defining a first amount of data and sending additional data packets, the sum of the data in each additional data packet being equal to said first amount of data; and
gradually increasing the amount of data sent until the additional amount of data being sent is equal to said difference.

17. Apparatus according to claim 16, wherein said processor is configured to gradually increase the amount of data sent by increasing the amount of data in each additional data packet.

18. Apparatus according to claim 16, wherein said processor is configured to gradually increase the amount of data sent by increasing the number of additional data packets sent.

19. Apparatus according to claim 15, said processor is further configured to:
identify a condition that said difference is smaller than a specified threshold, and
stop provision of said first audio-visual data and provide second audio-visual data to said terminal without sending additional data packets.

20. Apparatus according to claim 15, wherein said processor is further configured to, after the sending of additional data packets has commenced:
identify a condition that the amount of data being sent to said terminal exceeds the available bandwidth; and
stop sending said additional data packets.

21. Apparatus according to claim 15, wherein said processor is configured to identify said condition that the amount of data being sent to the terminal is less than the available bandwidth by:
monitoring a measurement of packet loss; and
identifying when said measurement of packet loss falls below a second specified threshold.

22. Apparatus according to claim 21, wherein said measurement of packet loss is a sample of four loss fractions, wherein each of said loss fractions is contained within a report packet received from said network-connected terminal and represents a percentage of recent packets that have not been received by said network-connected terminal.

23. Apparatus according to claim 22, wherein said measurement of packet loss falls below said second specified threshold when three consecutive samples are passed, wherein a passed sample contains three loss fractions that do not exceed $^{100}/_{256}$.

24. Apparatus according to claim 15, wherein said processor is further configured to, subsequent to said second audio-visual data being provided to said network-connected terminal:
identify a condition that the amount of data being sent to said terminal exceeds than the available bandwidth;
stop provision of said second audio-visual data to said terminal; and
provide said first audio-visual data to said terminal.

25. Apparatus according to claim 24, wherein said processor is configured to identify said condition that the amount of data being sent to the terminal exceeds the available bandwidth by:

monitoring a measurement of packet loss; and
identifying when said measurement of packet loss exceeds a first specified threshold.

26. Apparatus according to claim 25, wherein said measurement of packet loss is a sample of four loss fractions, wherein each of said loss fractions is contained within a report packet received from said network-connected terminal and represents a percentage of recent packets that have not been received by said network-connected terminal.

27. Apparatus according to claim 26, wherein said first specified threshold is exceeded when two out of said four loss fractions exceed $^{100}/_{256}$.

28. Apparatus according to claim 15, wherein said processor is configured to modify said characteristic of said packets by applying a sequence number offset to the sequence number of each packet in said second audio-visual data.

* * * * *